US012654823B2

(12) United States Patent
Kaijala et al.

(10) Patent No.: US 12,654,823 B2
(45) Date of Patent: Jun. 16, 2026

(54) MAST NAVIGATION LIGHT

(71) Applicant: Lippert Components, Inc., Elkhart, IN (US)

(72) Inventors: Murray Kaijala, Elkhart, IN (US); Martin E. Flynn, Niles, MI (US); David A. Lehman, Lancaster, PA (US); Scott C. McKinnon, Union City, MI (US)

(73) Assignee: LIPPERT COMPONENTS, INC., Elkhart, IN (US)

( * ) Notice: Subject to any disclaimer, the term of this patent is extended or adjusted under 35 U.S.C. 154(b) by 465 days.

(21) Appl. No.: 18/195,857

(22) Filed: May 10, 2023

(65) Prior Publication Data

US 2023/0365238 A1 Nov. 16, 2023

Related U.S. Application Data

(60) Provisional application No. 63/340,127, filed on May 10, 2022.

(51) Int. Cl.

| | |
|---|---|
| ***B63B 45/02*** | (2006.01) |
| ***F21V 21/26*** | (2006.01) |
| ***F21W 107/20*** | (2018.01) |

(52) U.S. Cl.
CPC .............. *B63B 45/02* (2013.01); *F21V 21/26* (2013.01); *F21W 2107/20* (2018.01)

(58) Field of Classification Search
CPC ......... B63B 45/00; B63B 45/02; B63B 45/04; B63B 2201/08; B63B 2221/24; B60Q 1/24; B60Q 1/26; B60Q 1/2657; F21V 21/26; F21W 2107/20
See application file for complete search history.

(56) References Cited

U.S. PATENT DOCUMENTS

| | | | | | |
|---|---|---|---|---|---|
| 3,851,166 | A * | 11/1974 | Kohler | B63B 45/02 | 362/396 |
| 3,900,725 | A * | 8/1975 | Komon | B63B 45/04 | 362/647 |
| 5,142,457 | A * | 8/1992 | Wehner | B63B 45/02 | D26/29 |
| 5,882,109 | A * | 3/1999 | McKinney | B63B 45/00 | 362/477 |
| 6,019,489 | A | 2/2000 | Wiggerman | | |
| 6,062,713 | A * | 5/2000 | Renlger | B63B 45/00 | 362/477 |
| 6,155,195 | A * | 12/2000 | Nirenberg | F21V 21/22 | 362/477 |
| 6,164,803 | A * | 12/2000 | Reniger | F21V 21/06 | 362/477 |

(Continued)

FOREIGN PATENT DOCUMENTS

| | | | |
|---|---|---|---|
| WO | WO 2021/041930 | 3/2021 | |
| WO | WO-2021041930 A1 * | 3/2021 | B63B 45/04 |

*Primary Examiner* — Brian P Wolcott
(74) *Attorney, Agent, or Firm* — NIXON & VANDERHYE P.C.

(57) ABSTRACT

A mast navigation light includes a base assembly affixable to a surface, a pivot mechanism secured to the base assembly, a mast coupled at a proximal end with the pivot mechanism, and a light secured to a distal end of the mast. The pivot mechanism is configured to effect pivoting of the mast about at least two axes.

21 Claims, 28 Drawing Sheets

(56) References Cited

U.S. PATENT DOCUMENTS

| | | | | |
|---|---|---|---|---|
| 6,848,815 | B1 * | 2/2005 | Born | B63B 45/04<br>362/477 |
| 7,018,081 | B2 * | 3/2006 | Hopkins | A01K 75/02<br>362/540 |
| 8,172,437 | B2 | 5/2012 | Burke | |
| 9,533,742 | B2 * | 1/2017 | Deven | F21V 31/005 |
| 11,035,533 | B1 * | 6/2021 | Rojas | F21S 6/002 |
| 11,554,837 | B2 * | 1/2023 | Popa | F21V 21/26 |
| 2007/0064434 | A1 | 3/2007 | Hepworth et al. | |
| 2013/0039081 | A1 | 2/2013 | Czipri et al. | |
| 2020/0017176 | A1 * | 1/2020 | Peng | B63B 45/04 |
| 2020/0073017 | A1 | 3/2020 | Williams et al. | |
| 2021/0061424 | A1 | 3/2021 | Popa et al. | |

* cited by examiner

MAST NAVIGATION LIGHT

CROSS-REFERENCES TO RELATED APPLICATIONS

This application claims the benefit of U.S. Provisional Patent Application Ser. No. 63/340,127, filed May 10, 2022, the entire content of which is herein incorporated by reference.

STATEMENT REGARDING FEDERALLY SPONSORED RESEARCH OR DEVELOPMENT (NOT APPLICABLE)

BACKGROUND

The invention relates to a mast navigation light suited for marine applications and, more particularly, to a mast navigation light that is pivotable relative to an attachment surface about at least two axes.

Marine vessels generally require navigation lights, which in some instances include light poles that are vertically mounted to the highest point on the vessel. These lights typically include a static poll or mast that is mounted to the boat directly and include a light at the top of the mast.

In a use orientation, with the light and mast extending upward from the highest point on the boat, the light and mast can be subjected to damage due to impact with low bridges or the like. Additionally, such mast lights can be burdensome when securing a cover to the vessel.

SUMMARY

It would thus to be desirable to provide a mast navigation light that is selectively positionable in use and can also be easily pivoted to a stowed position. The mast navigation light of the described embodiments is rotatable/pivotable about at least two axes. The mast navigation light is pivotable forward and aft (pitch rotation) to optimize light visibility based on a Bimini frame position. Additionally, the mast navigation light is pivotable laterally (yaw rotation), allowing for stowing the mast in a horizontal position that is essentially parallel to the frame to minimize damage and allow the mast navigation light to be enclosed within a Bimini cover.

In some embodiments, the mast navigation light utilizes a T-post with two independent axes including a swivel for yaw rotation and a cylindrical pivot for pitch rotation. Pivoting about either axis can be clamped using a single cam lock lever. In a variation, a guided ball and socket joint can be unlocked and locked with a clamping mechanism. In some embodiments, the mast includes a flexible section near its base. The flexible section may be an elastomeric tube, a coil spring, or the like, allowing the mast to flex at a specific spring rate to avoid damage in the event of impact (i.e., low bridge, tree, limb, boat cover, etc.) and return to its nominal position.

The described embodiments similarly include anti-rotation features and a wire routing option.

The base member may include an adapter plate that helps to mount the mast navigation light more securely to a frame member, such as the frame member of a Bimini top. The adapter plate may incorporate an optional wire routing on its side.

In an exemplary embodiment, a mast navigation light includes a base assembly affixable to a surface, a pivot mechanism secured to the base assembly, a mast coupled at a proximal end with the pivot mechanism, and a light secured to a distal end of the mast. The pivot mechanism is configured to effect pivoting of the mast about at least two axes.

The mast may include a flex section. The flex section may include one of an elastomeric tube or a coil spring. The pivot mechanism may be configured to effect forward and aft pivoting of the mast and to effect lateral pivoting of the mast.

The pivot mechanism may include a cap coupled with the base assembly and rotatable relative to the base assembly about a first axis, and a T-post coupled with the cap and pivotable relative to the cap about a second axis perpendicular to the first axis. In this context, the mast may be connected to the T-post. The cap may include a pivot slot in which the T-post may be pivotable, where the pivot slot defines a pivot range for the T-post. The mast navigation light may further include a cam lock lever coupled with the T-post and displaceable between an unlocked position and a locked position. In this context, the cam lock lever may include at least one cam surface that locks the T-post in place when the cam lock lever is displaced to the locked position. The T-post may include a cross member and a vertical leg defining a T-shape, where the cross member is coupled with the cap. A cross-section of the cross member may be non-circular. The mast may be connected to the vertical leg of the T-post. The mast may include a flex section, and the flex section may be connected to the vertical leg of the T-post. The base assembly may include a circumferential slot, and the cap may include a stop member disposed in the circumferential slot, where the circumferential slot defines rotational limits for the cap relative to the base assembly.

The base assembly may include a wire exit slot. The base assembly may include an adapter plate securable to a frame member and a base plate connected to the adapter plate, and the pivot mechanism may be secured to the base plate.

In another exemplary embodiment, a mast navigation light includes a base assembly affixable to a surface, a pivot mechanism secured to the base assembly, a mast coupled at a proximal end with the pivot mechanism, a light secured to a distal end of the mast. The pivot mechanism is configured to selectively effect forward and aft pivoting of the mast in use and lateral pivoting of the mast to a stowed position.

BRIEF DESCRIPTION OF THE DRAWINGS

These and other aspects and advantages will be described in detail with reference to the accompanying drawings, in which.

DETAILED DESCRIPTION

Figure 1:
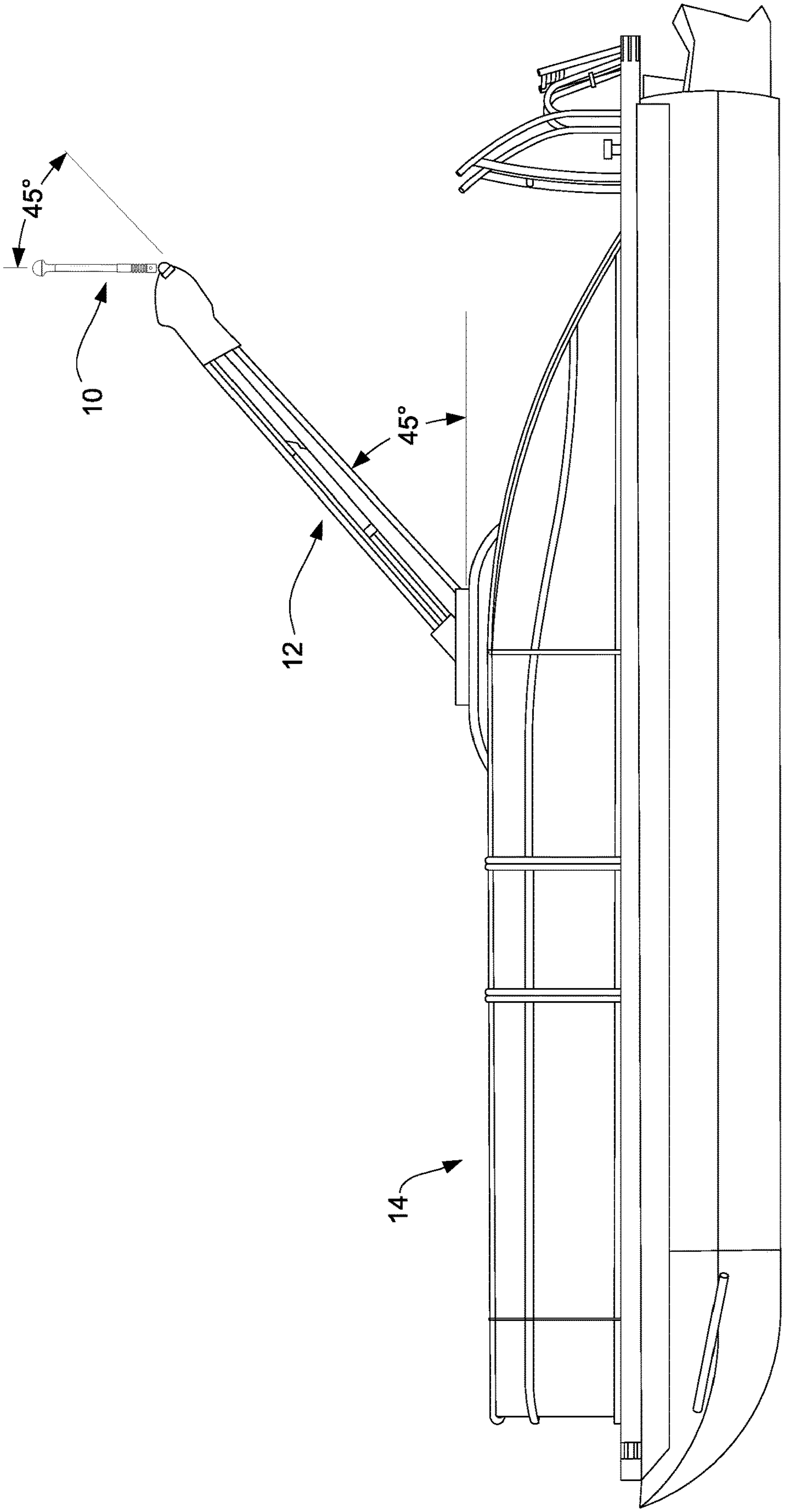
FIG. 1 shows a pontoon boat with a mast navigation light secured to a Bimini top.

Navigation lights are desirable for piloting marine vessels in low or no light. Such navigation lights are typically vertically mounted to a highest point on the vessel. FIG. 1 shows an exemplary application of a mast navigation light 10 secured to a Bimini frame 12 mounted on a pontoon boat 14.

Figure 2:
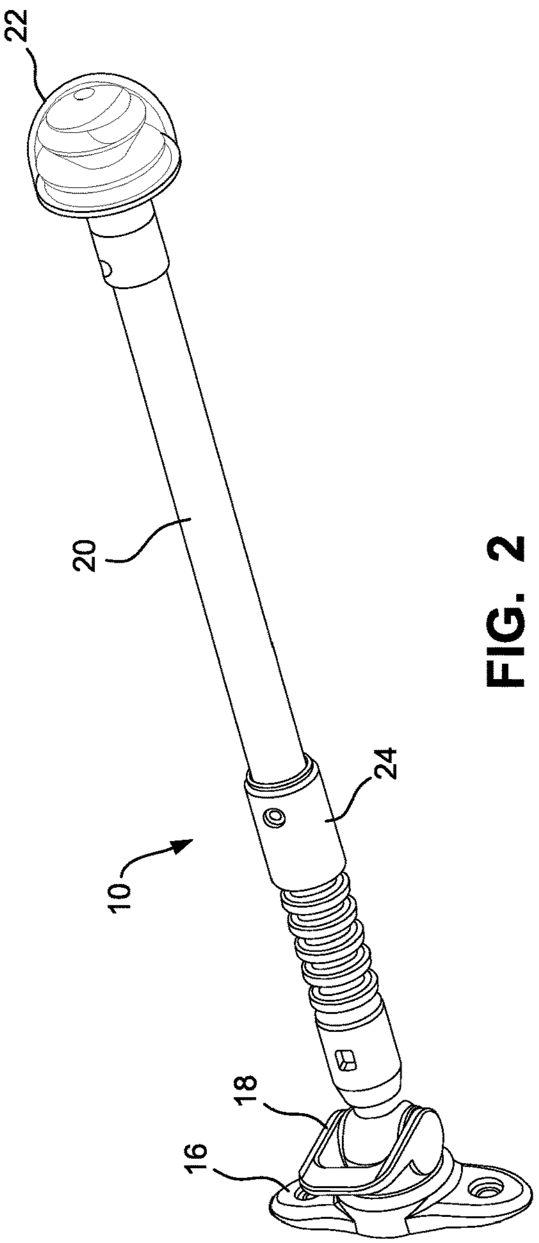
FIG. 2 shows an exemplary mast navigation light.
Figure 3:
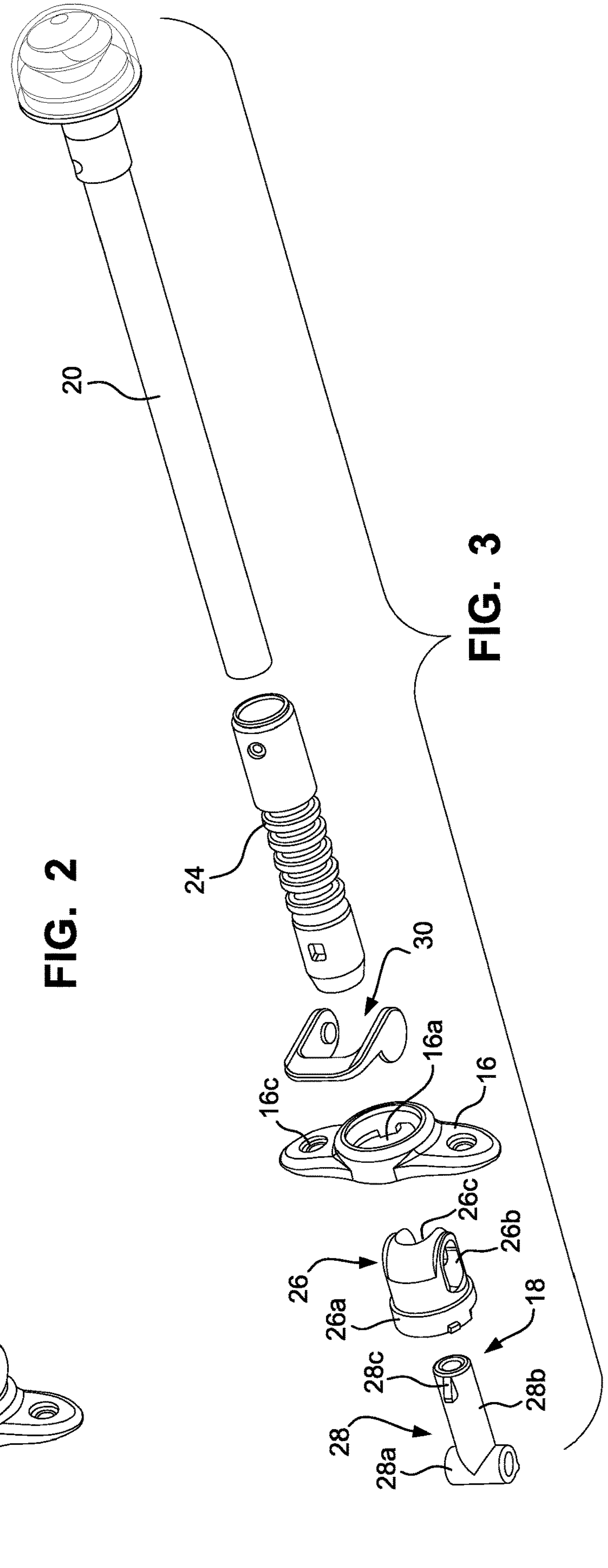
FIG. 3 is an exploded view of the mast navigation light shown in FIG. 2.
Figure 4:
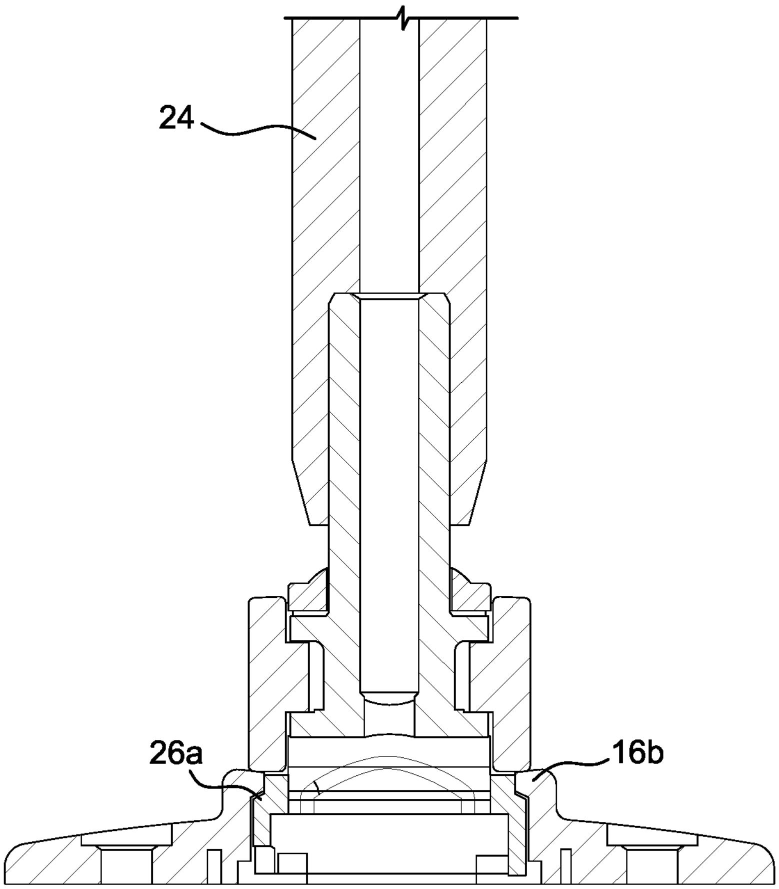
FIGS. 4-10 are sectional views of the assembly.
Figure 5:
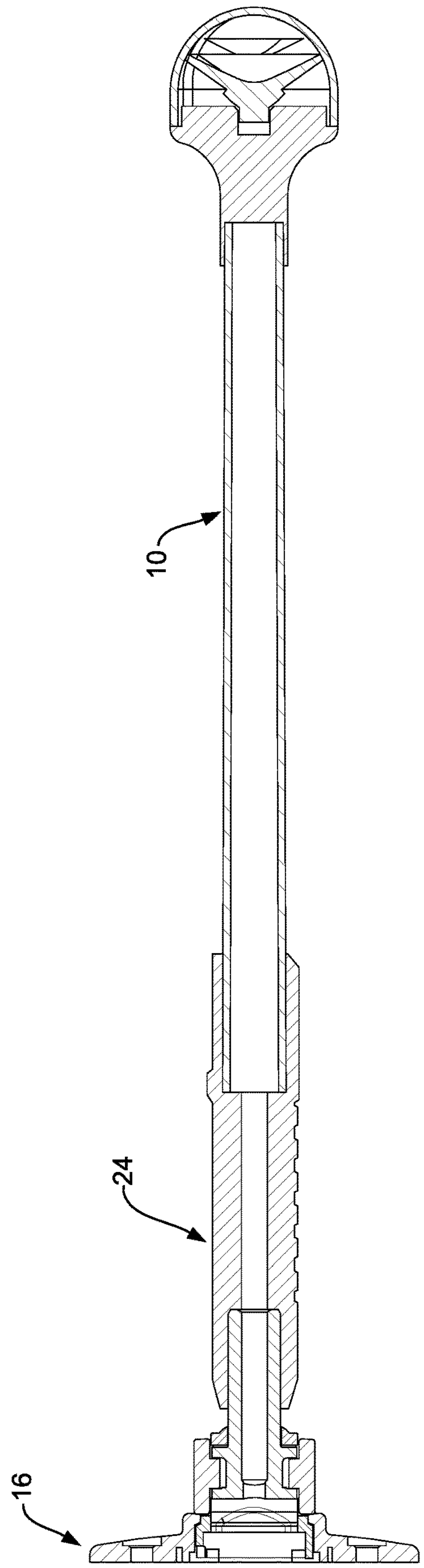
Figure 6:
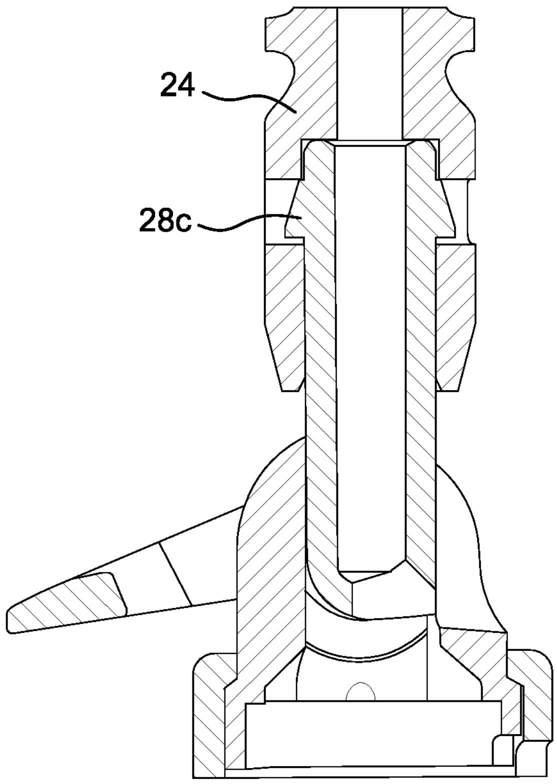
Figure 7:
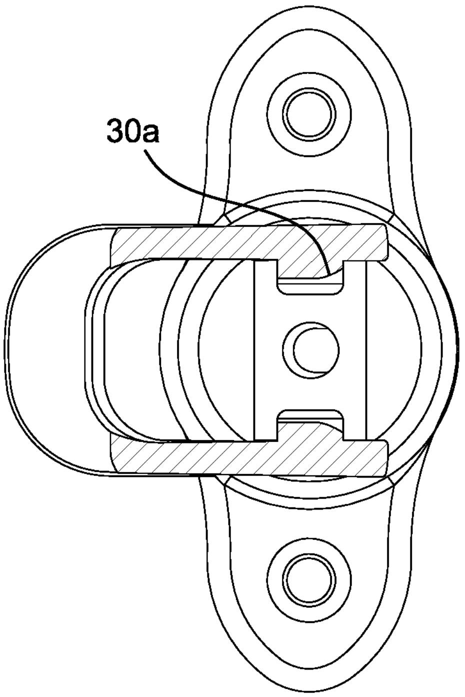

With reference to FIGS. 2 and 3, the mast navigation light 10 includes a base assembly 16 affixable to surface. In some embodiments, the surface may be a frame member of the Bimini top, although the assembly can be secured at any desirable location on the vessel. A pivot mechanism 18 is secured to the base assembly, and a mast 20 is coupled at a proximal end with the pivot mechanism 18. A light 22 is secured to a distal end of the mast 20.

In some embodiments, the mast 20 includes a flex section 24. The flex section 24 may be one of an elastomeric tube or a coil spring or the like. The flex section 24 allows the mast 20 to flex at a specific spring rate to avoid damage in the event of impact (i.e., low bridge, tree, limb, boat cover, etc.) and return to its nominal position.

As described in more detail below, the pivot mechanism 18 is configured to effect pivoting of the mast 20 about at least two axes. That is, the pivot mechanism effects at least forward and aft pivoting of the mast and lateral pivoting of the mast.

With reference to FIGS. 3-10, the pivot mechanism 18 may include a cap 26 coupled with the base assembly 16 and rotatable relative to the base assembly 16 about a first axis. The cap 26 includes a shoulder 26*a*, side openings 26*b* and an oriented pivot slot 26*c*.

The base assembly 16 includes a central opening 16*a* and a shoulder 16*b*. The cap 26 is inserted through the opening 16*a* in the base assembly 16 until the shoulder 26*a* of the cap 26 engages the shoulder 16*b* of the base assembly 16. The base assembly 16 also includes apertures 16*c* for receiving connectors to secure the base to the surface.

The pivot mechanism 18 includes a T-post 28 coupled with the cap 26 and pivotable relative to the cap 26 about a second axis perpendicular to the first axis. The T-post 28 includes a cross member 28*a* and a vertical leg 28*b* that together define a T-shape. The cross member 28*a* extends through the openings 26*b* in the cap 26, and the vertical leg 28*b* is disposed in the pivot slot 26*c* of the cap 26.

Figure 8:
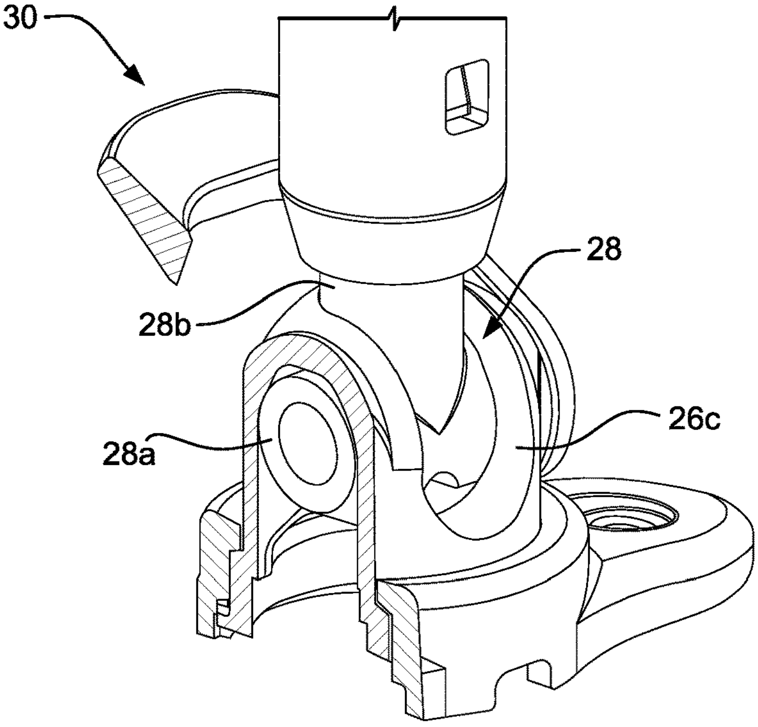

The mast 20 is connected to the vertical leg 28*b* of the T-post 28. In some embodiments, the flex section 24 of the mast 20 is connected to the vertical leg 28*b*. The T-post 28 may include a barb 28*c* to better secure the engagement with the mast 20 or the flex section 24 of the mast 20. See, for example, FIG. 6. With reference to FIG. 8, the T-post 28 is pivotable in the pivot slot 26*c*, and the pivot slot 26*c* defines a pivot range for the T-post 28.

Figure 8A:
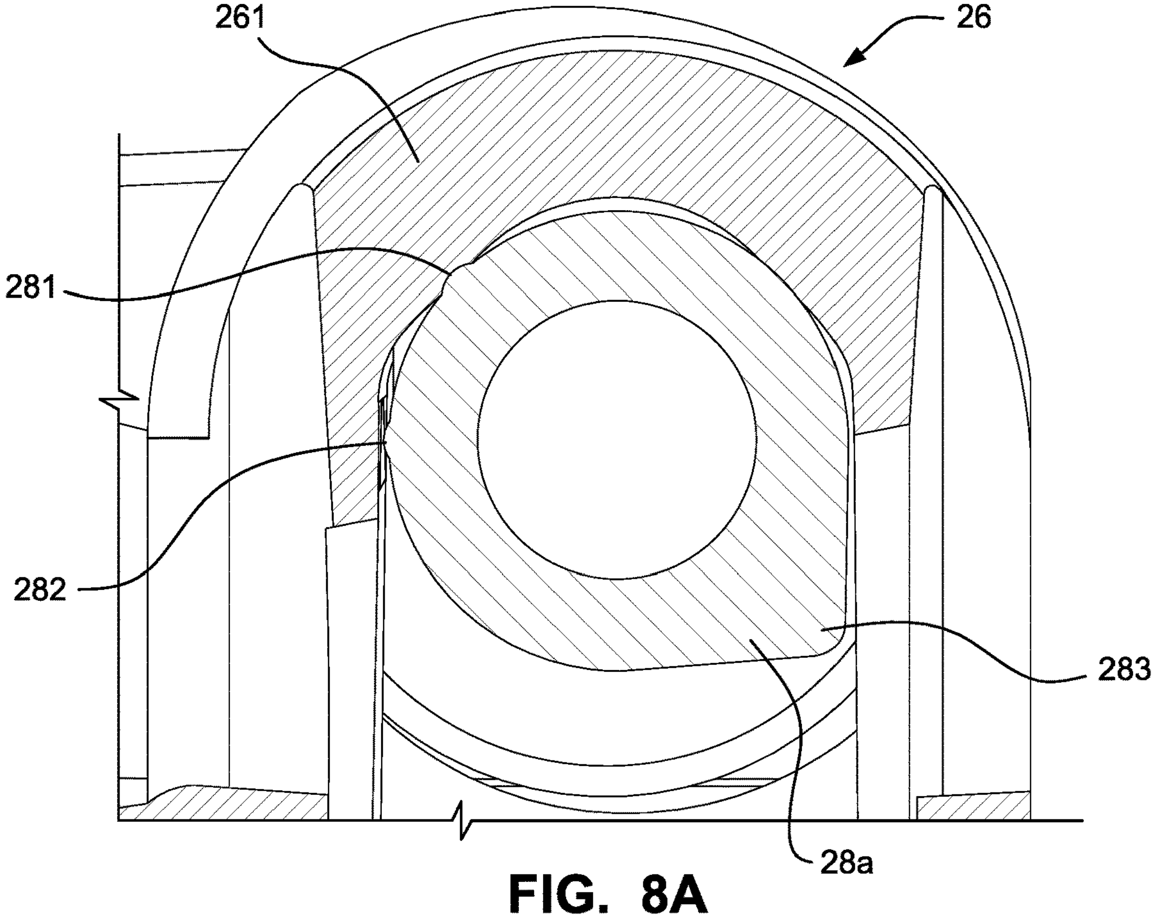
Figure 9:
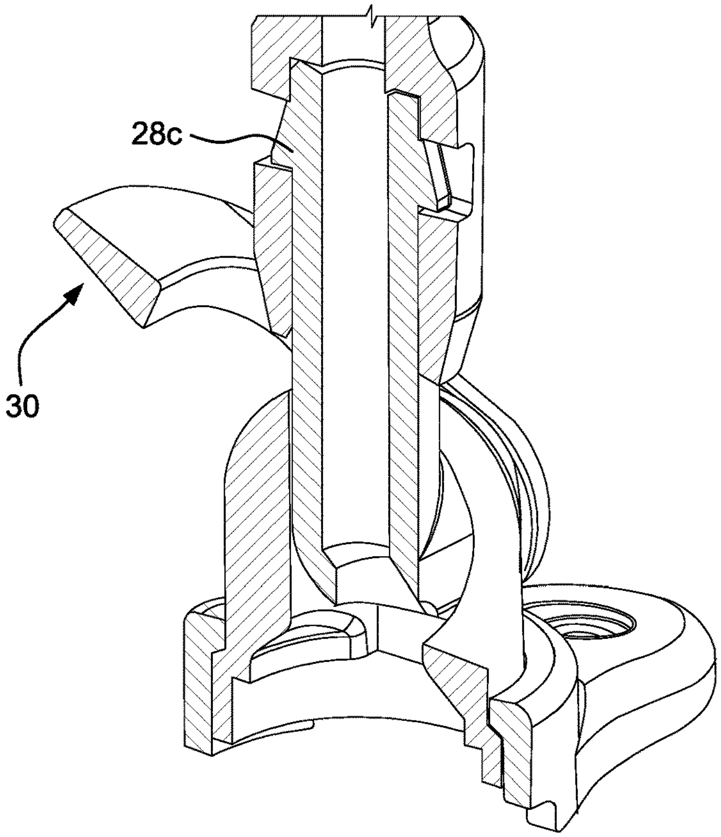
Figure 10:
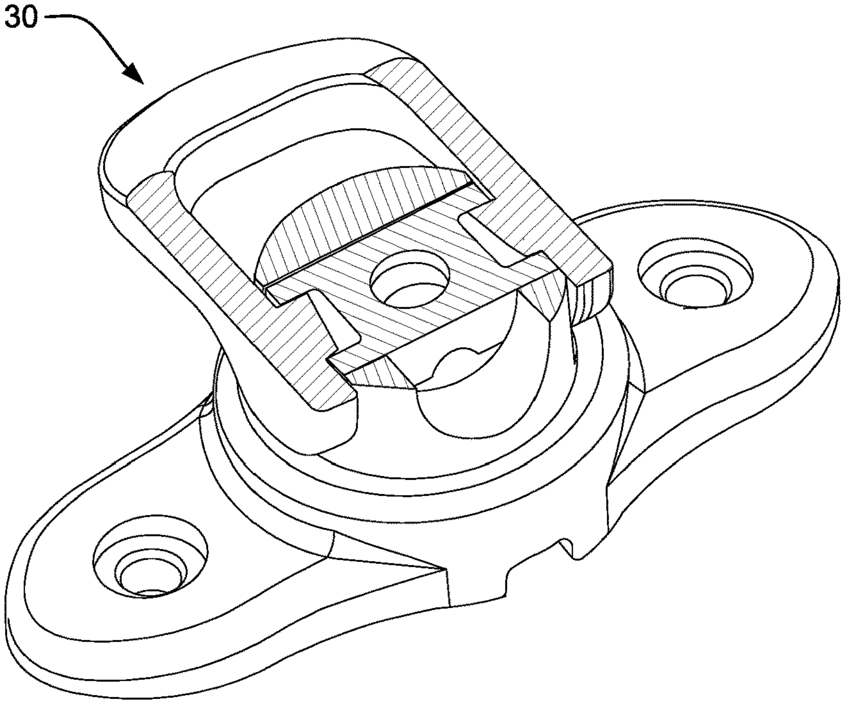

A cam lock lever 30 is coupled with the T-post 28. The cam lock lever 30 includes trunnion posts 30*a* that snap into openings in the cross member 28*a* of the T-post 28. As best seen in FIG. 8, a cross-section of the cross member 28*a* is non-circular. In some embodiments, locking detent features are included to fix the mast navigation light in the preferred fore-aft pitch position, resisting vibration, shock, and wind loading. For example, with reference to FIG. 8A, the cross member 28*a* of the T-post 28 may include a first convex protrusion 281, corresponding to a zero degree position, and a second convex protrusion 282, corresponding to a forty-five degree position, selectively engageable with a concave detent 261 in the cap 26. The cross member 28*a* may also include a rotational stop 283. The cam lock lever 30 includes at least one cam surface, and preferably multiple cam surfaces, that locks the T-post 28 in place when the cam lock lever 30 is displaced to a locked position.

Figure 11:
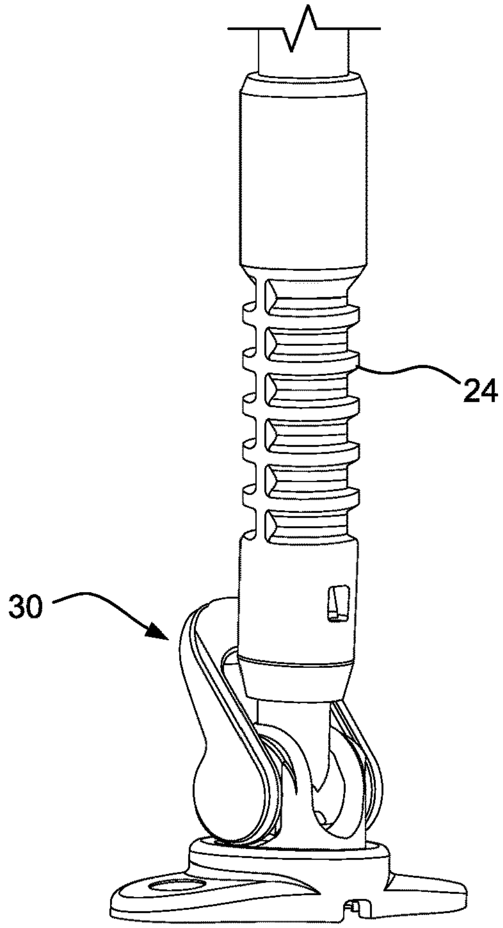
FIGS. 11-13 show the assembly in an unlocked configuration.
Figure 12:
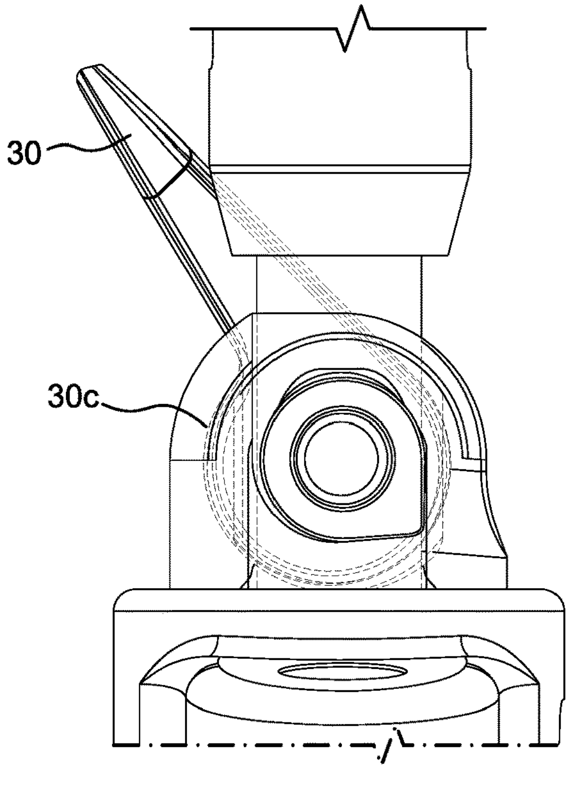
Figure 13:
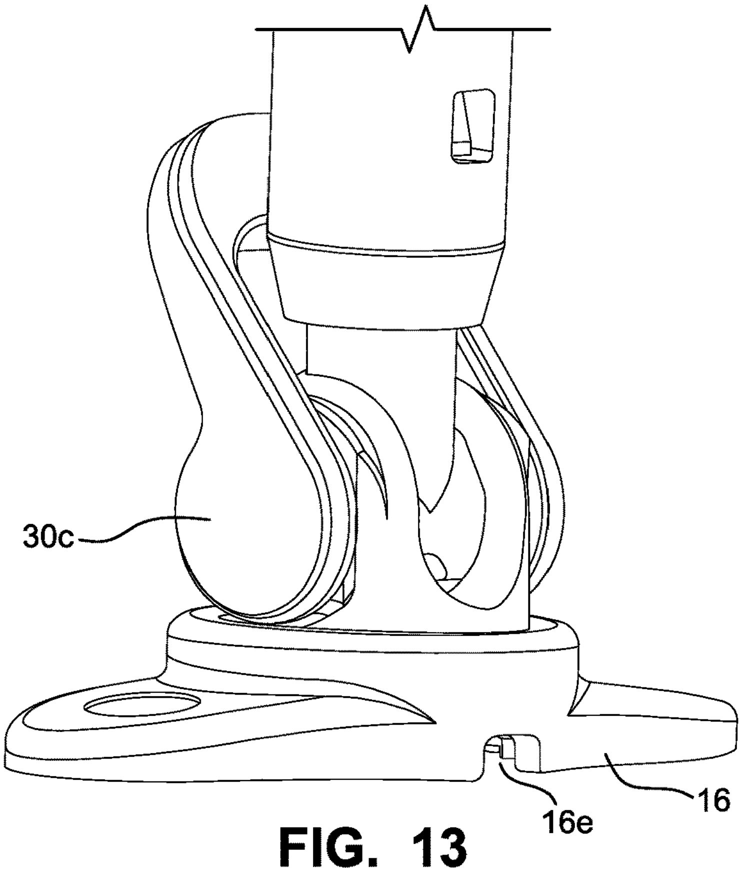
Figure 14:
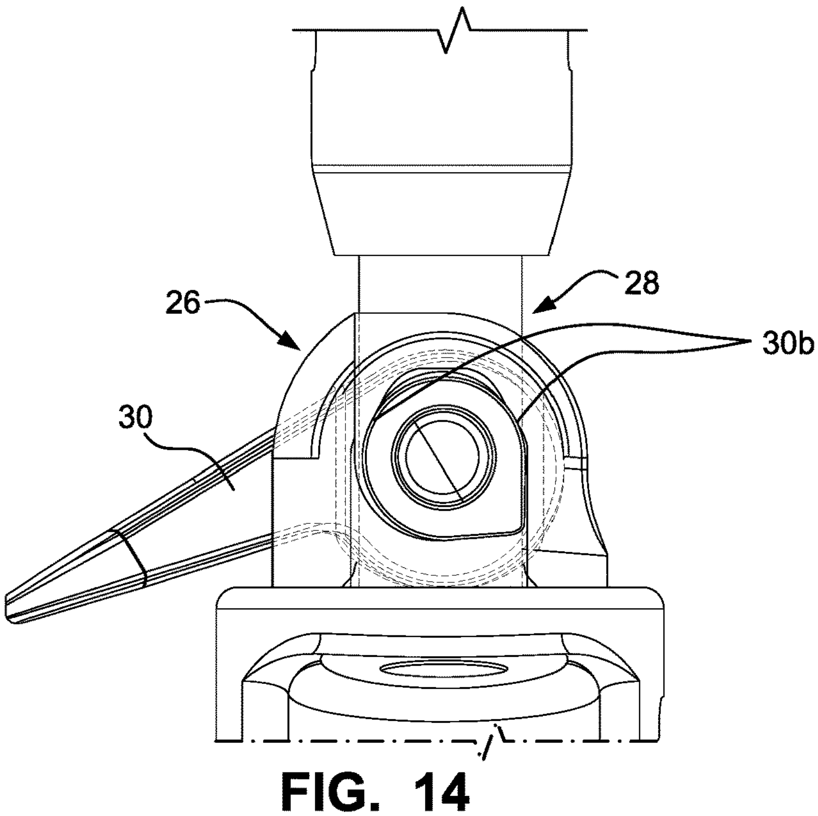
FIGS. 14 and 15 show the assembly in a locked configuration.
Figure 15:
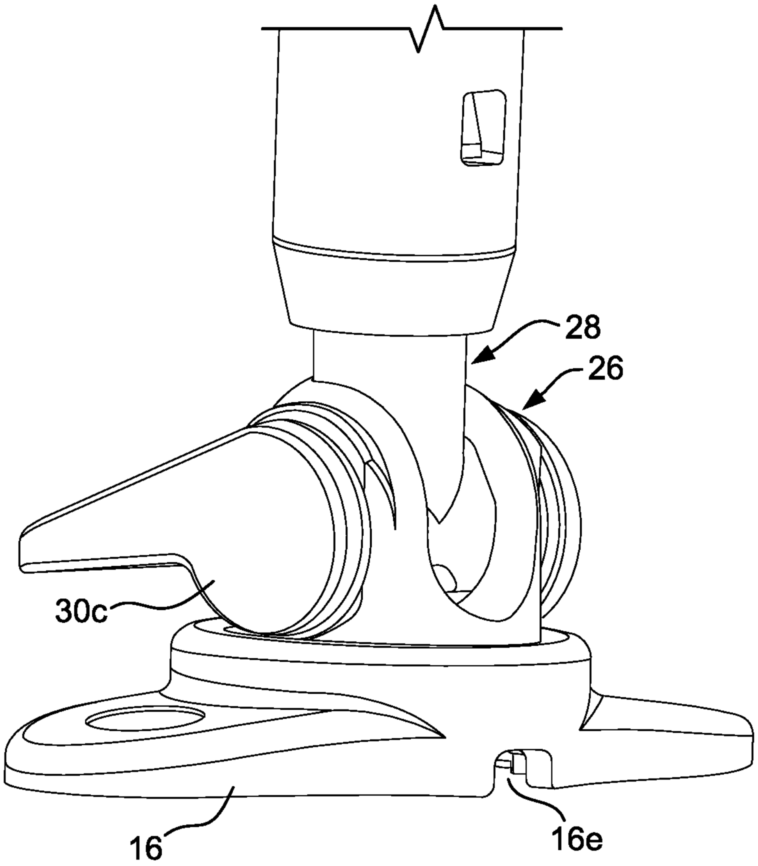

FIGS. 11-13 show the cam lock lever 30 in an unlocked position, and FIGS. 14 and 15 show the cam lock lever 30 in a locked position. In the exemplary configuration shown in FIGS. 12 and 14, the cam lock lever 30 includes contact surfaces 30*b* that engage the cap 26 in the locked position to lock the T-post 28 in place. Additionally, an eccentric camming lobe 30*c* of the cam lock lever 30 is spaced from the base assembly 16 in the unlocked position, and with reference to FIG. 15, the eccentric camming lobe 30*c* engages the base assembly 16 in the locked position.

Figure 16:
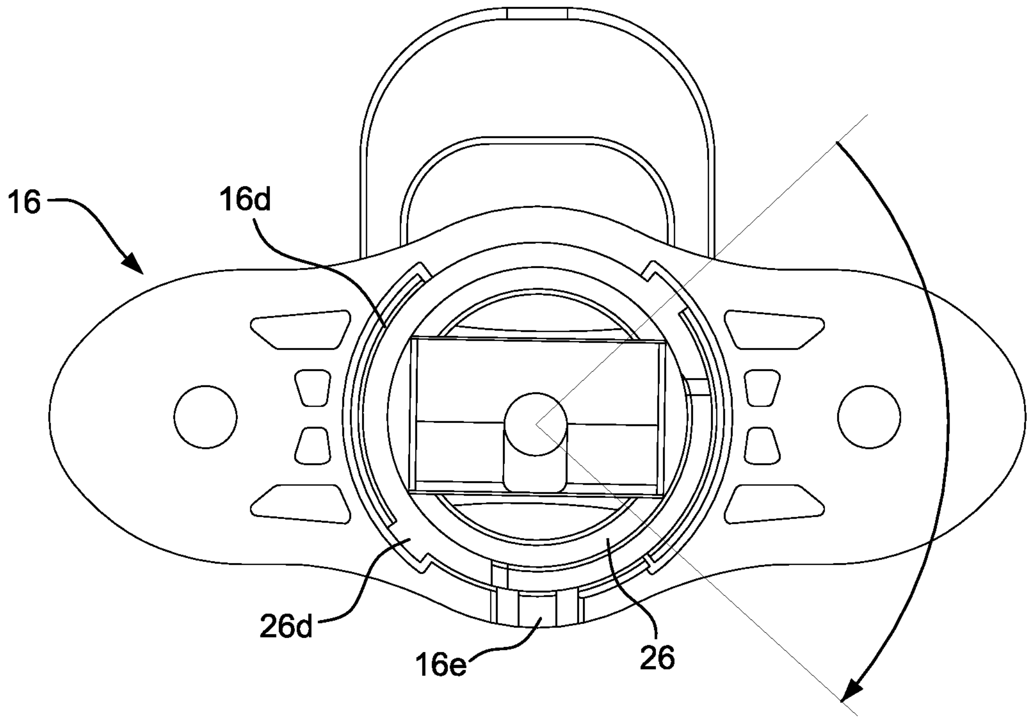
FIGS. 16 and 17 show an underside of the base assembly including an anti-rotation feature.
Figure 17:
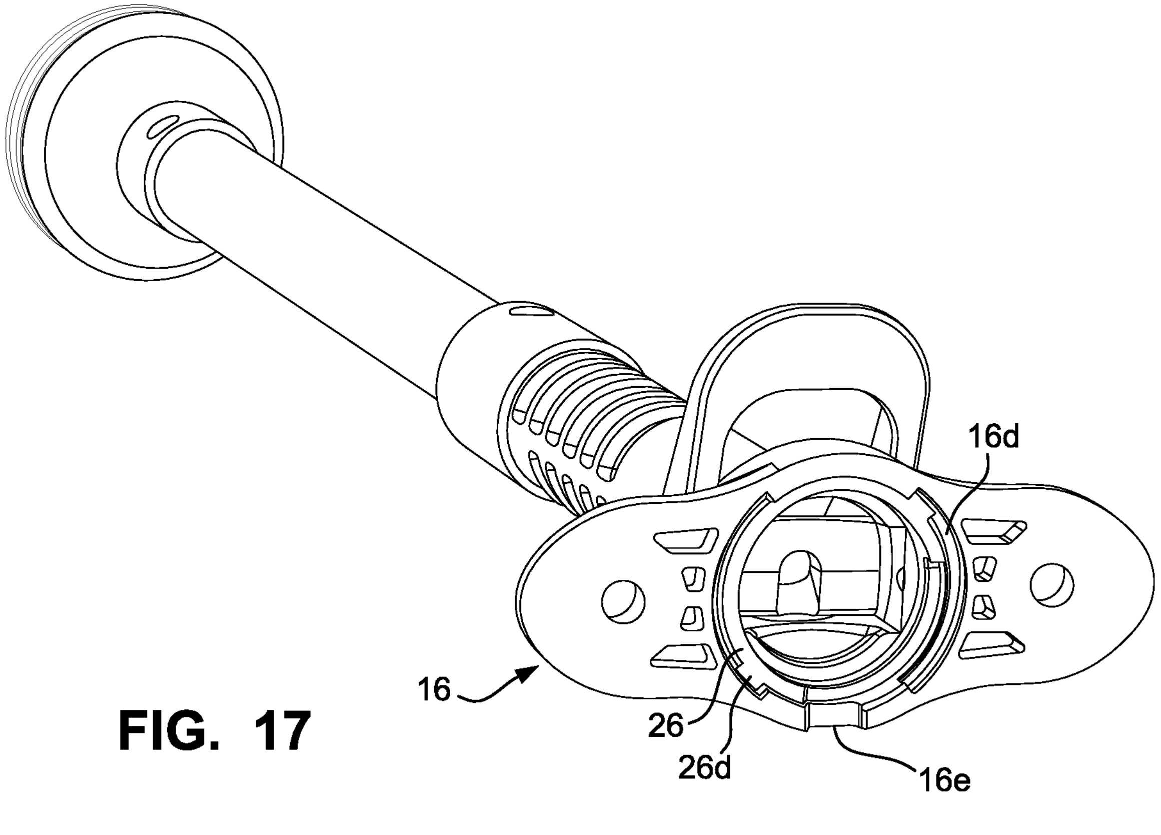

FIGS. 16 and 17 show an underside of the base assembly 16. The base assembly 16 includes at least one circumferential slot 16*d*. In the embodiment shown in FIGS. 16 and 17, the base assembly 16 includes two circumferential slots 16*d*. The cap 26 includes a corresponding at least one stop member 26*d* disposed in the circumferential slot 16*d*. The circumferential slot 16*d* defines rotational limits for the cap 26 relative to the base assembly 16. This feature prevents undesirable wire wrapping/twisting in use.

The base assembly 16 may also be provided with a wire exit slot 16*e* on its underside.

Figure 18:
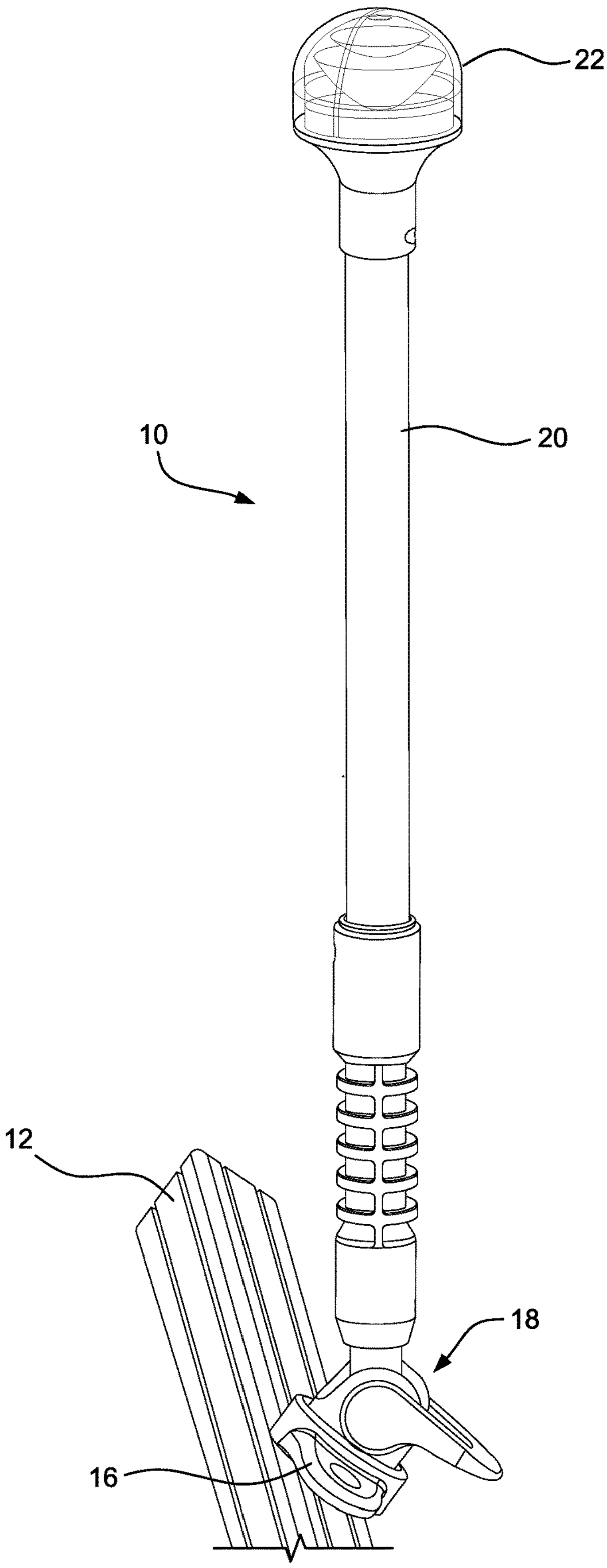
FIGS. 18-20 show the mast navigation light in various positions and pivoting on multiple axes.
Figure 19:
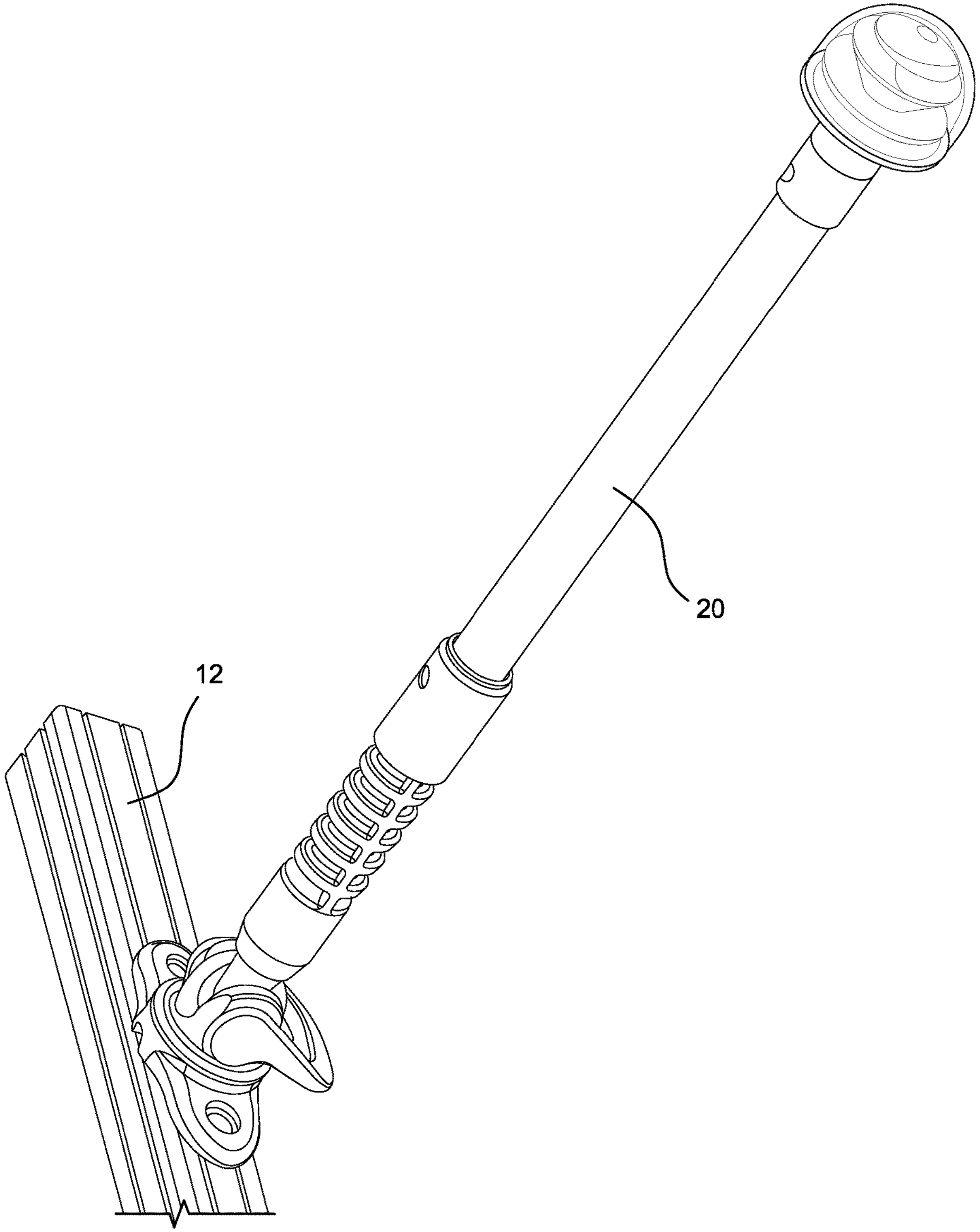
Figure 20:
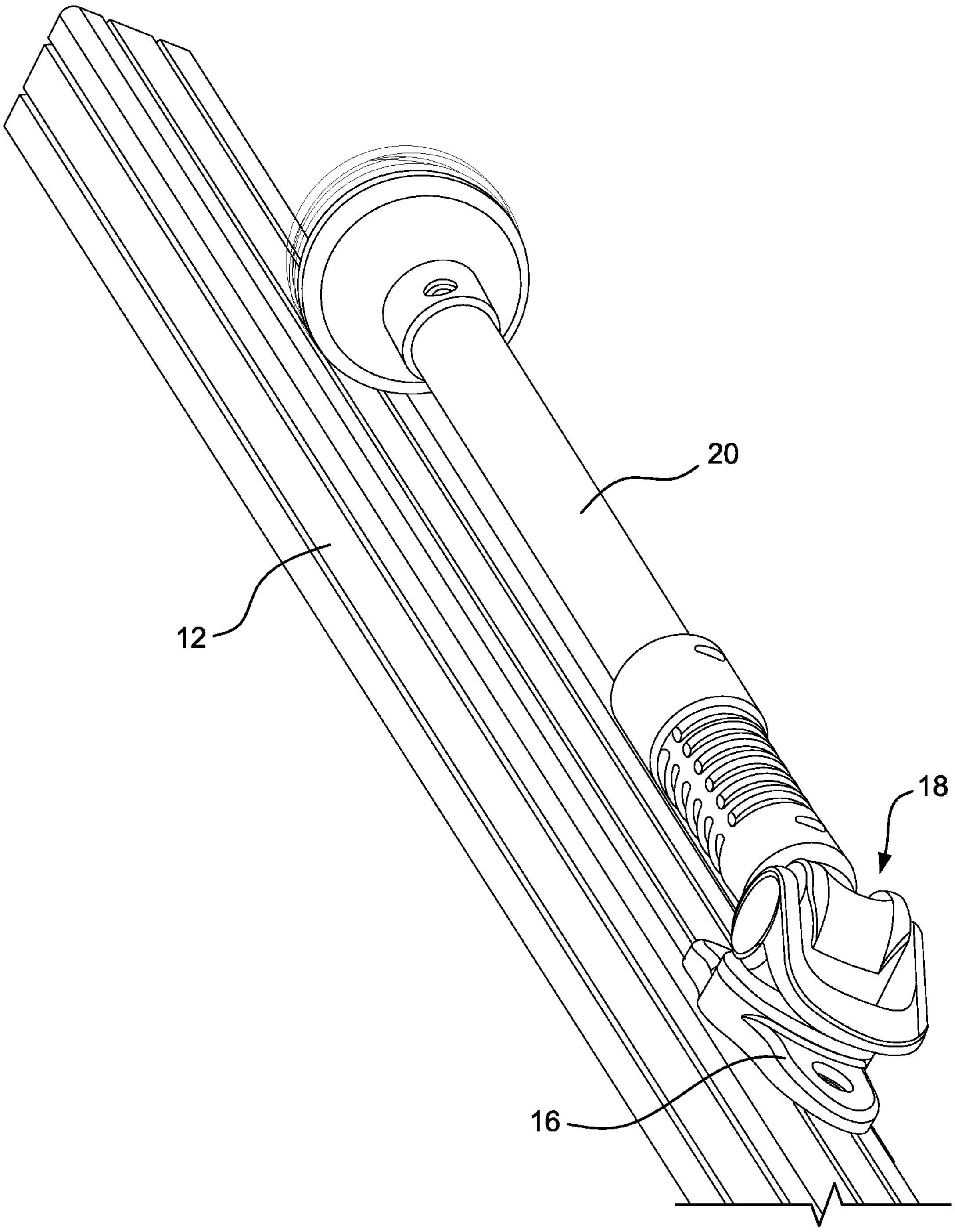

FIGS. 18-20 show selective orientations of the mast navigation light 10. The assembly is shown connected to a frame member of a Bimini top 12 for illustration purposes only. As noted, the base assembly 16 is affixable to any suitable surface.

FIG. 18 shows the pivot mechanism 18 with the pivot slot 26*c* oriented so that the mast 20 is pivotable forward and aft relative to the Bimini top frame member. In FIG. 18, the assembly is pitched forward in a vertical orientation, similar to the orientation shown in FIG. 1. In FIG. 19, the assembly is pivoted to a nominal position. In FIG. 20, the pivot mechanism 18 is rotated 90 degrees relative to the base assembly 16 so that the pivot slot 26*c* is oriented for lateral pivoting of the mast 20. In FIG. 20, the mast 20 is pivoted laterally into a stowed position, essentially overlaying the frame member of the Bimini top 12. In this position, the mast navigation light 10 is stowed parallel or nearly parallel to the frame to minimize potential damage and allow the mast navigation light 10 to be enclosed within a Bimini cover.

Figure 21:
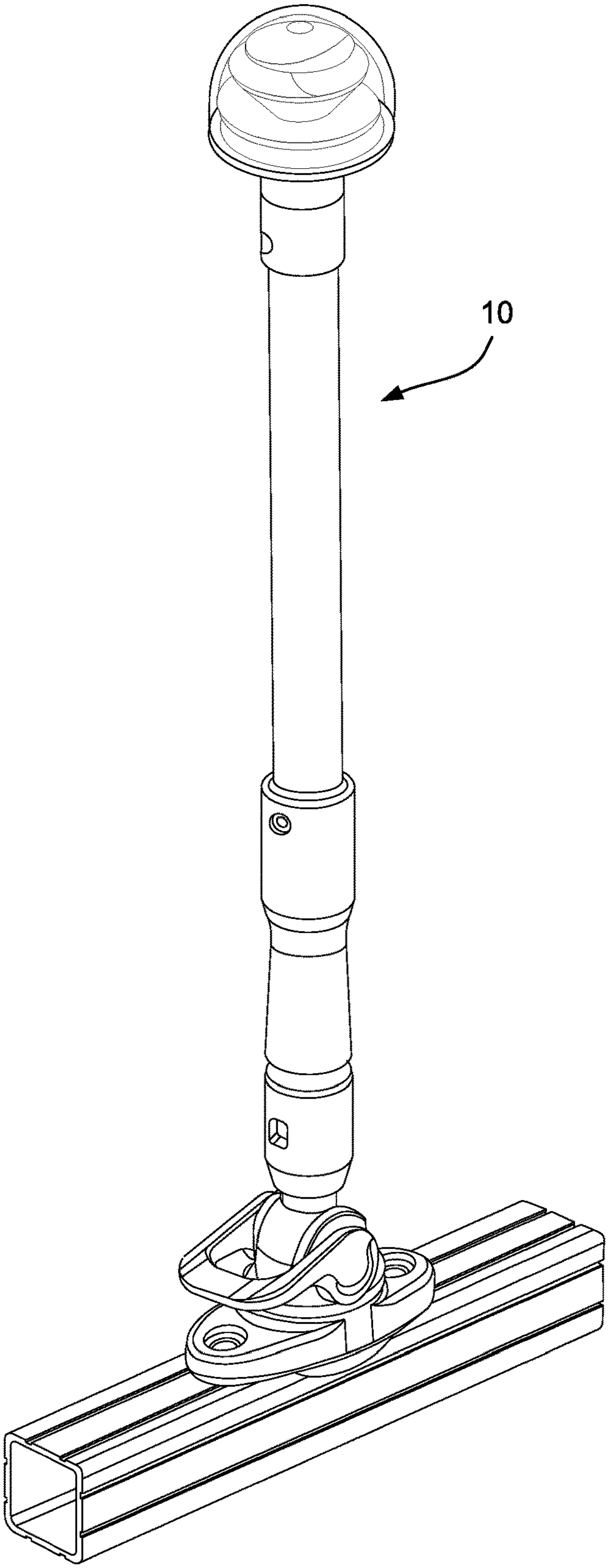
FIGS. 21-23 show the mast navigation light incorporating an adapter plate.
Figure 22:
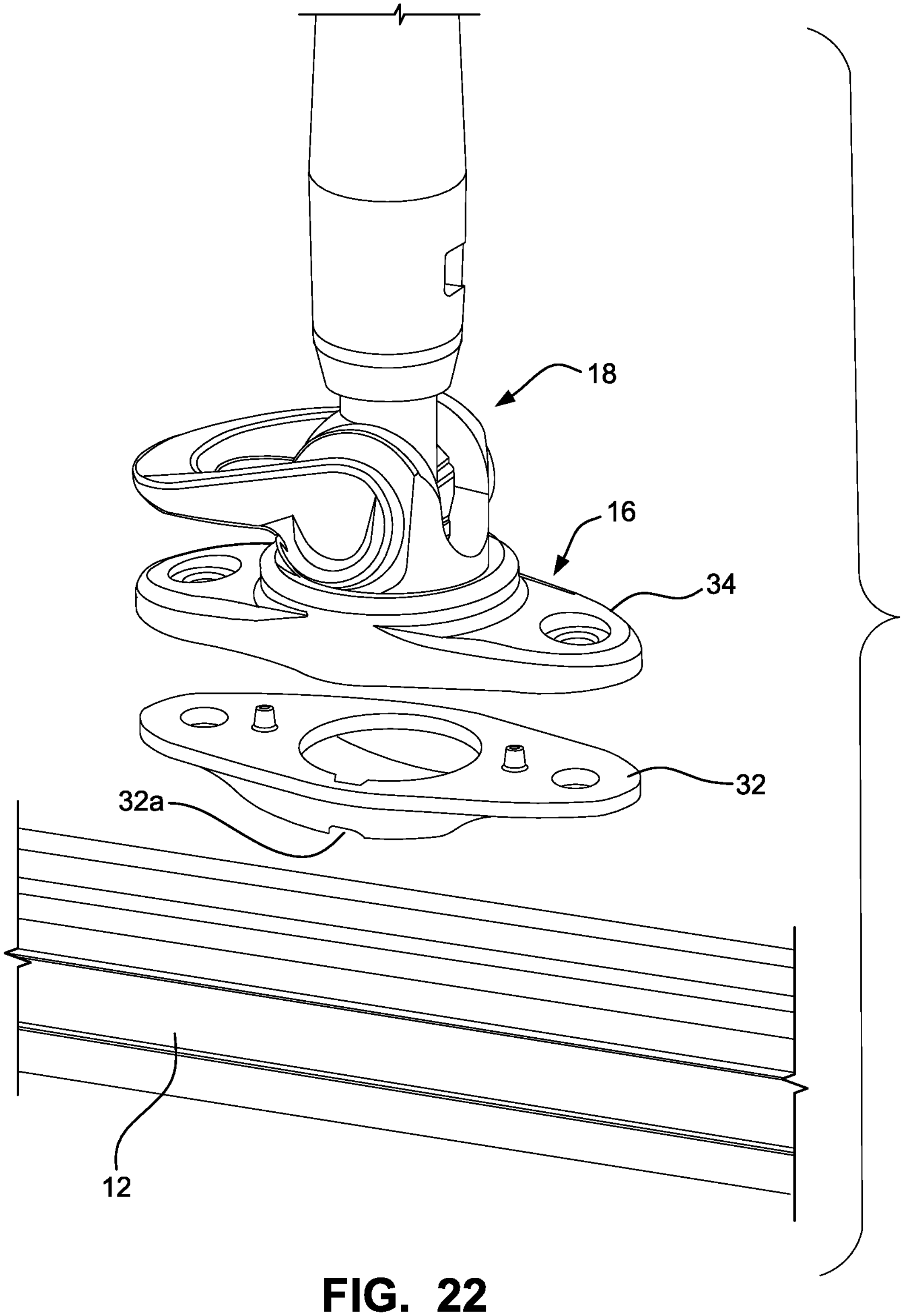
Figure 23:
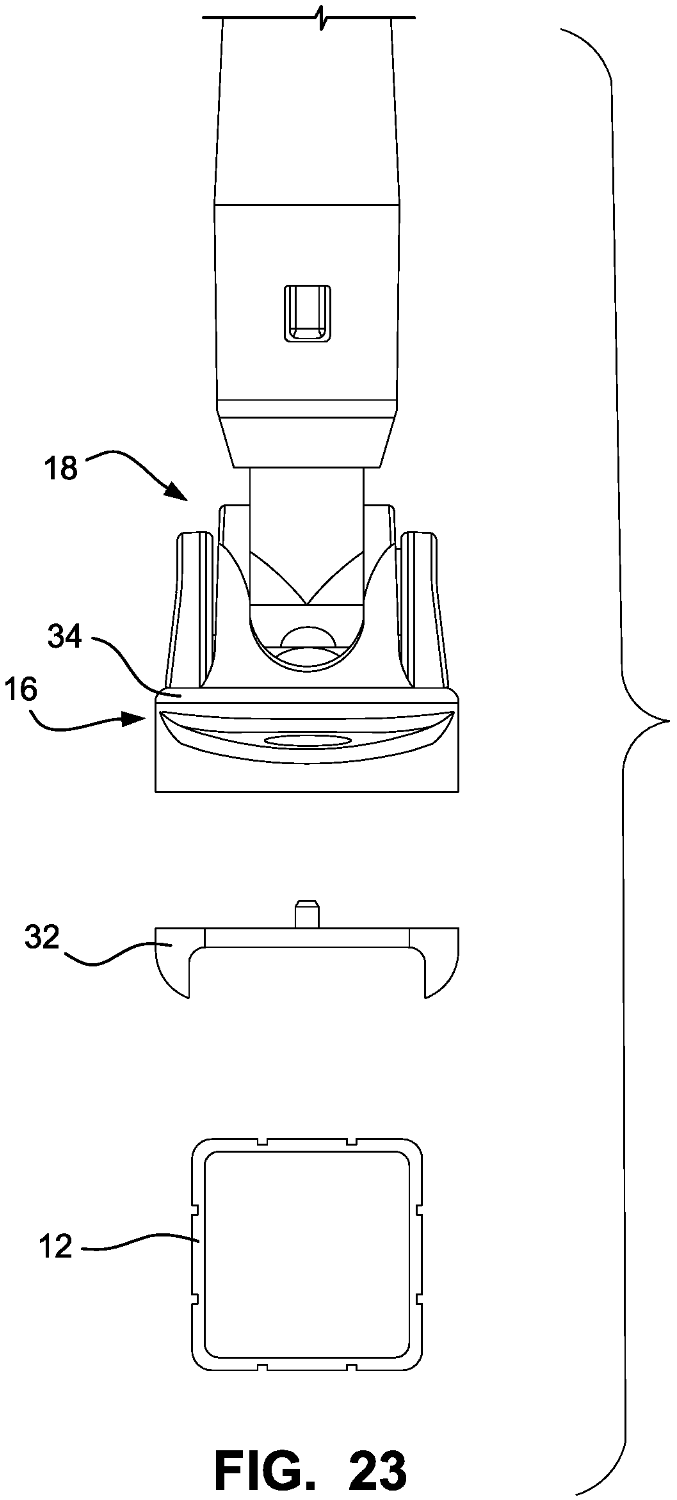
Figure 24:
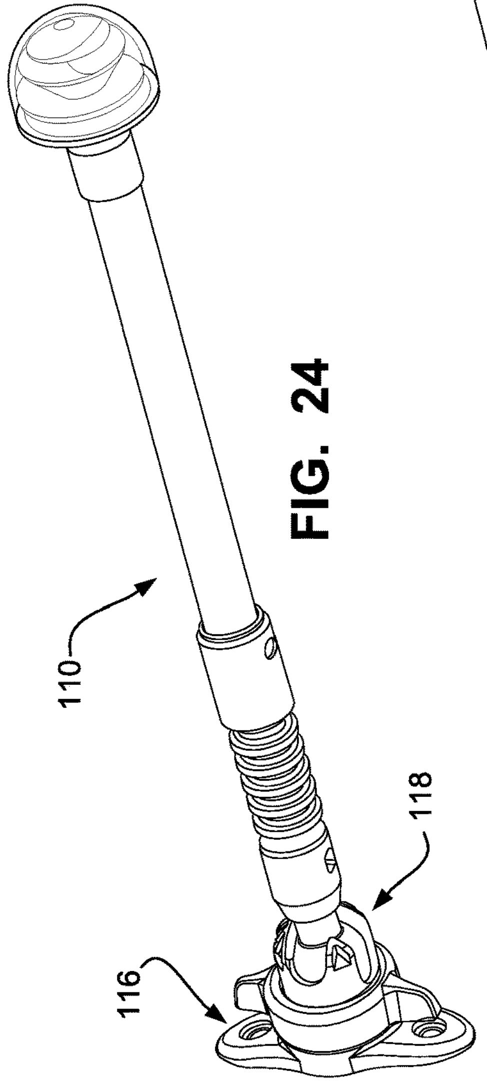
FIG. 24 shows an alternative embodiment of the mast navigation light.
Figure 25:
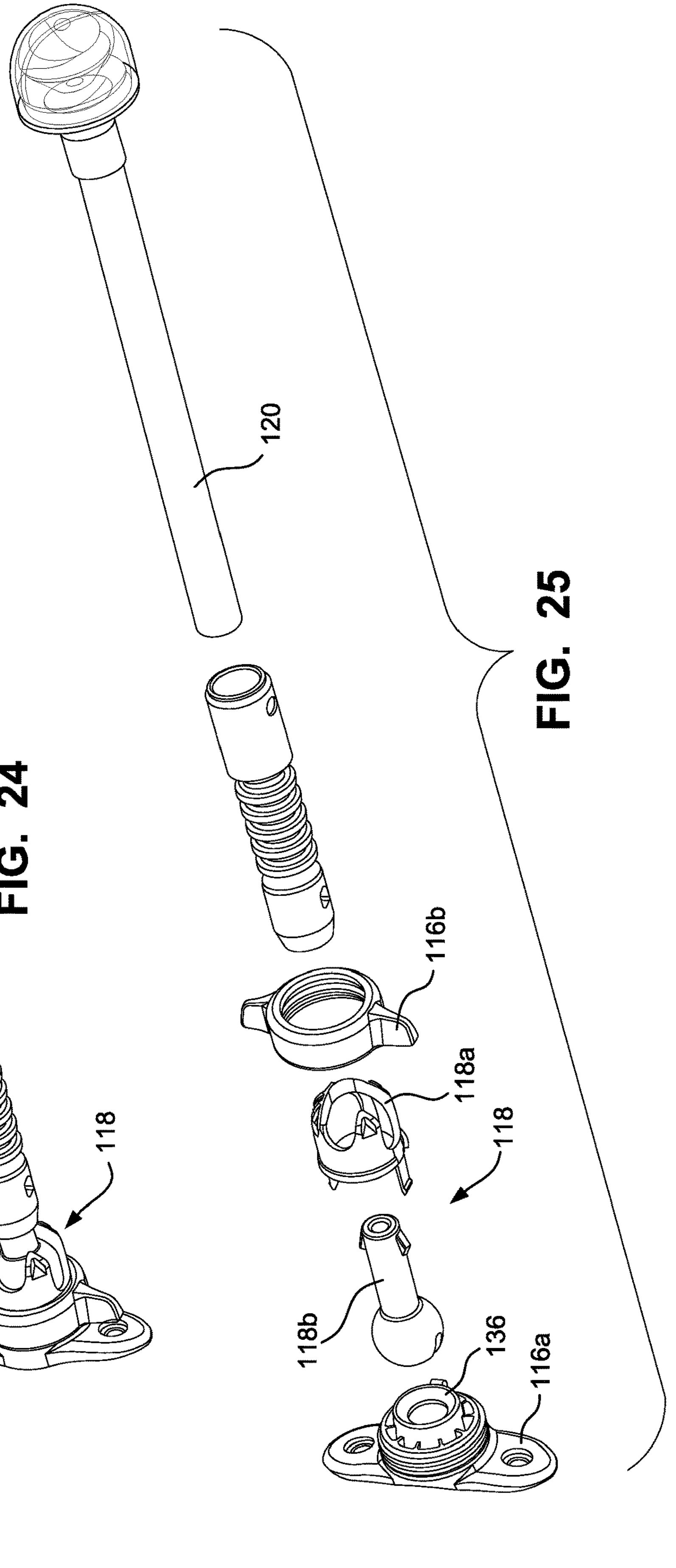
FIG. 25 is an exploded view of the embodiment shown in FIG. 24.
Figure 26:
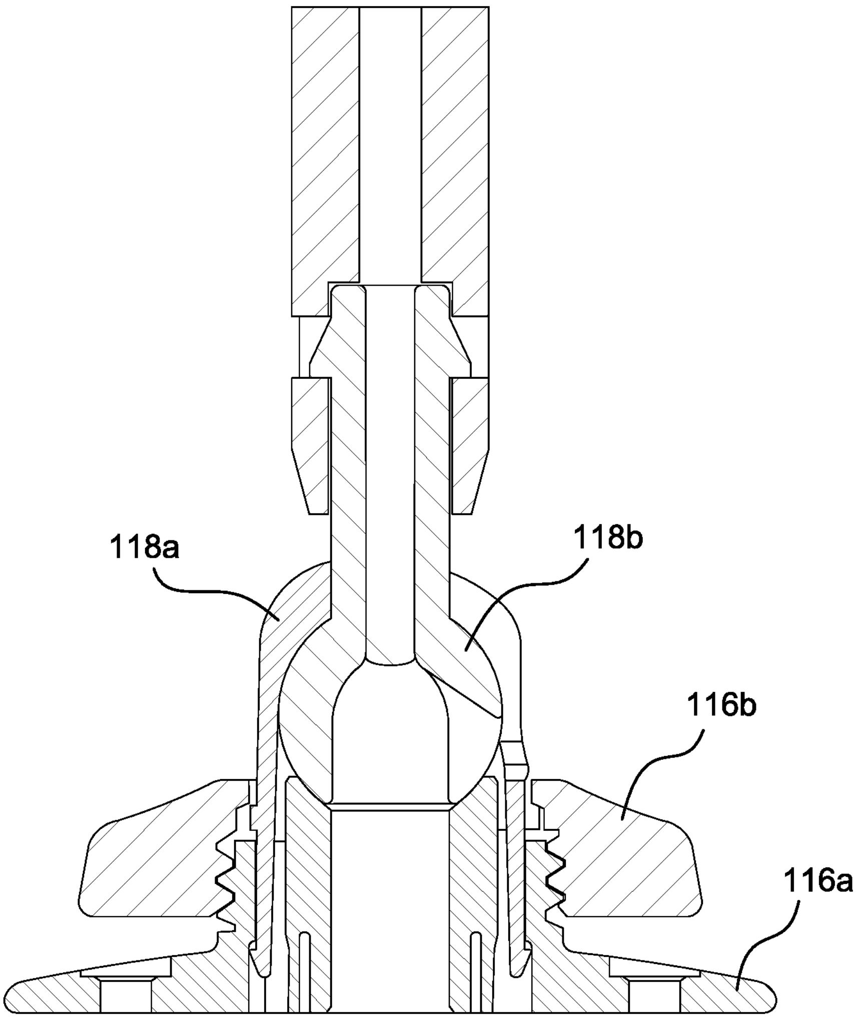
FIGS. 26-28 are sectional views of the assembly shown in FIG. 24.
Figure 27:
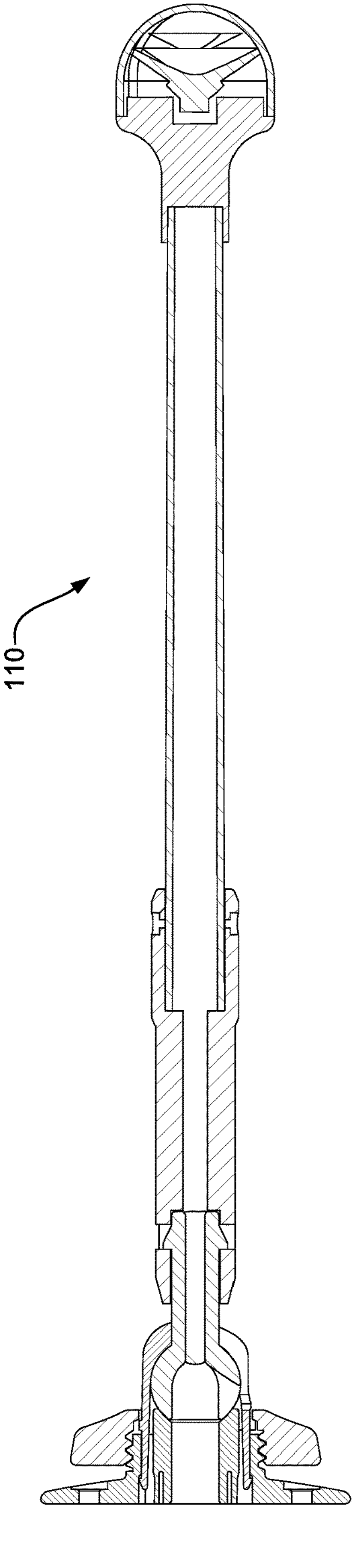
Figure 28:
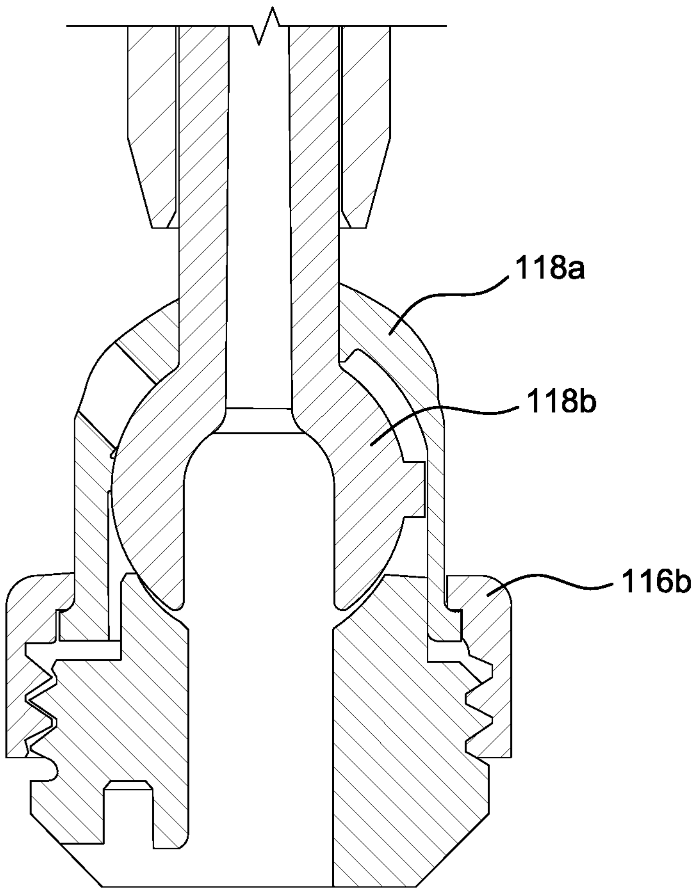

FIGS. 21-23 show a variation including an adapter plate 32 that helps to mount the mast navigation light 10 more securely to the frame member of the Bimini top 12. In this variation, the base assembly 16 includes the adapter plate 32 securable to a frame member of the Bimini top 12 or other suitable surface or structure and a base plate 34 connected to the adapter plate 32. The pivot mechanism 18 is secured to the base plate 34. The adapter plate 32 may also be provided with a wire routing slot 32*a* on its side.

FIGS. 24-28 show an alternative embodiment of the mast navigation light 110 where the pivot mechanism 118 includes a guided ball and socket joint that can be locked and unlocked with a clamping mechanism defined by the base assembly 116. The base assembly 116 includes a base plate 116*a* with external threads and a nut 116*b*. The base plate 116*a* includes an upward facing spherical surface 136. The pivot mechanism 118 includes a cap 118*a* and a ball shaft 118*b*. The ball shaft 118*b* engages the spherical surface 136 of the base plate 116*a*, and the cap 118*a* is fit over the ball shaft 118*b* into engagement with the ball portion of the ball shaft 118*b*. The cap 118*a* similarly includes spherical surfaces that fit over the ball end of the ball shaft 118*b*. The nut 116*b* is threaded on to the base plate 116*a* and clamps the cap 118*a* to the base plate 116*a*, generating friction at the ball surface to rotationally lock the mast 120.

Figure 29:
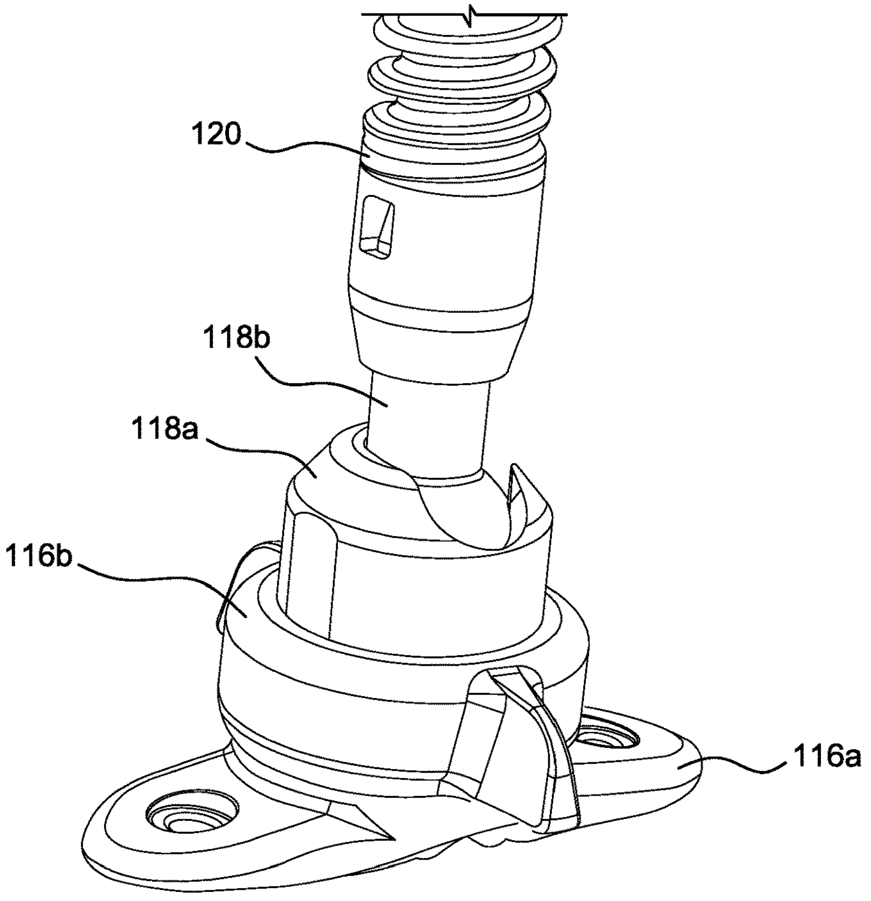
FIGS. 29 and 30 show the mast navigation light of FIG. 24 in an unlocked configuration.
Figure 30:
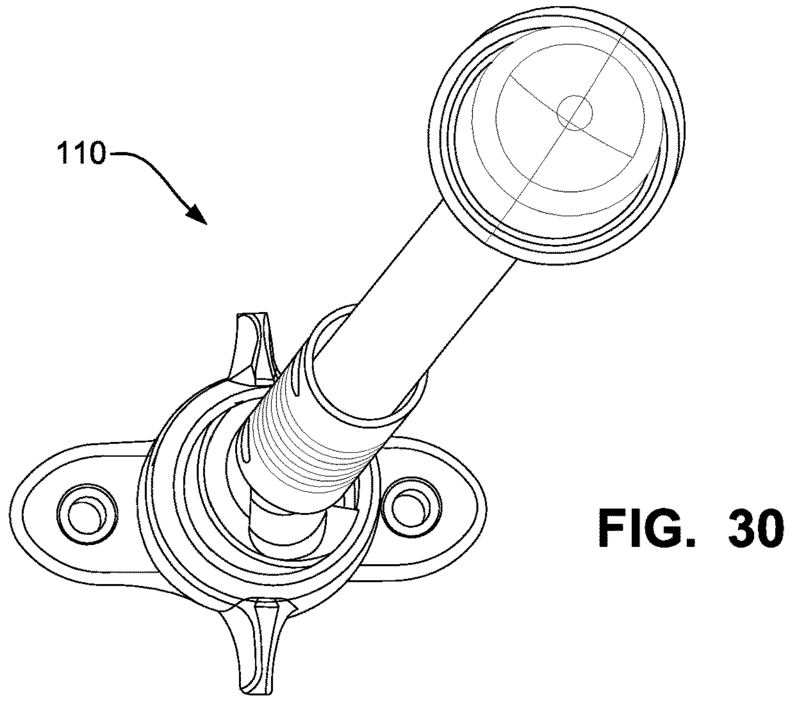
Figure 31:
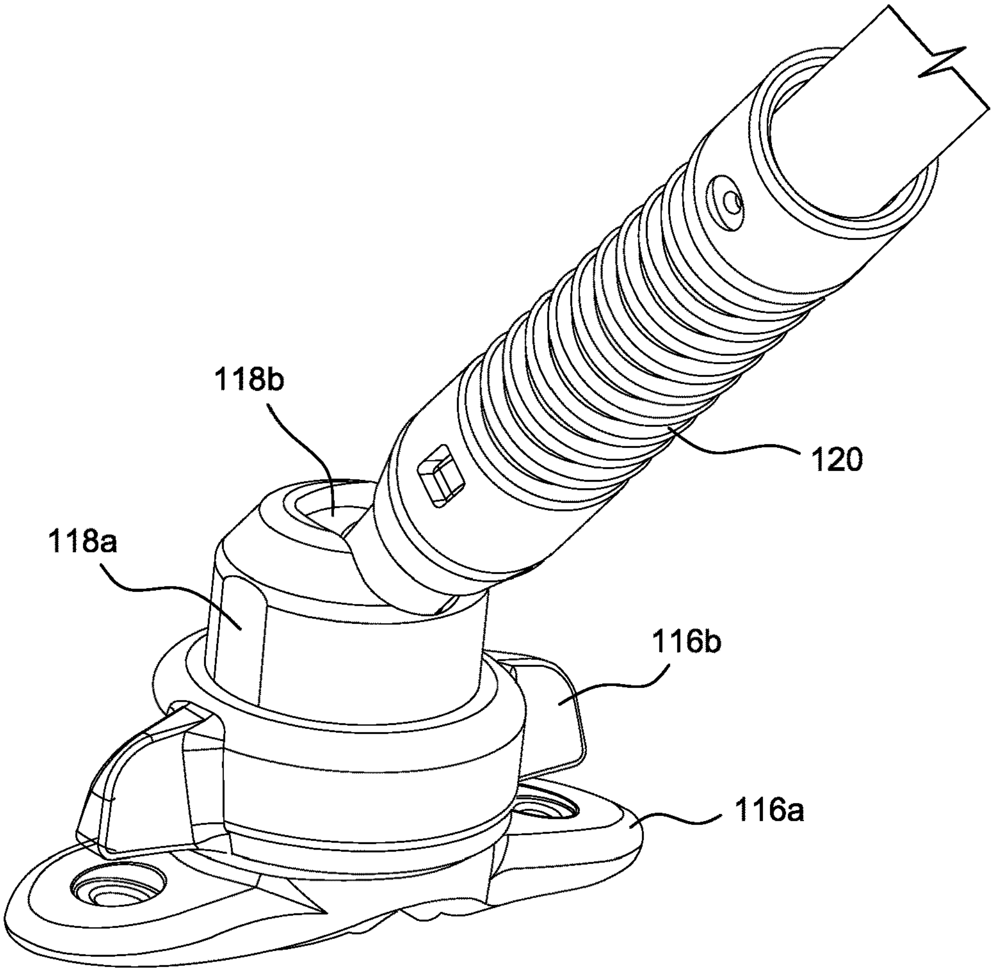
FIGS. 31 and 32 show the mast navigation light of FIG. 24 in a locked configuration.
Figure 32:
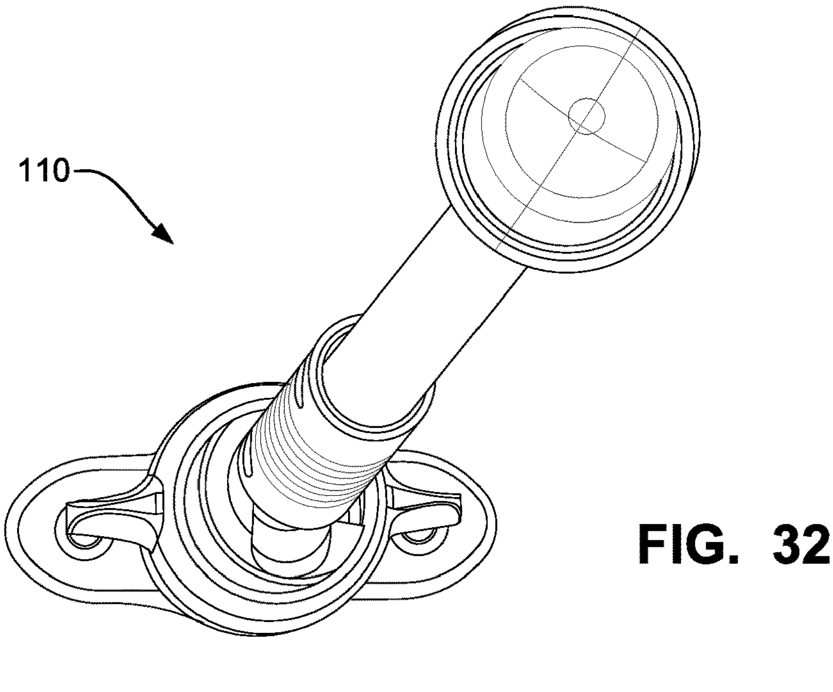

FIGS. 29 and 30 show the mast navigation light 110 in an unlocked position, where the mast 120 is pivotable via the pivot mechanism including the cap 118*a* and the ball shaft 118*b*. As shown, the nut 116*b* includes tabs or handles that in the exemplary unlocked position shown in FIGS. 29 and 30 are oriented perpendicular to the base plate 116*a*. In FIGS. 31 and 32, the nut 116*b* is turned 90 degrees such that the tabs or handles are aligned with the base plate 116*a*, and the pivot mechanism including the cap 118*a* and the ball shaft 118*b* locks the mast 120 in position.

Figure 33:
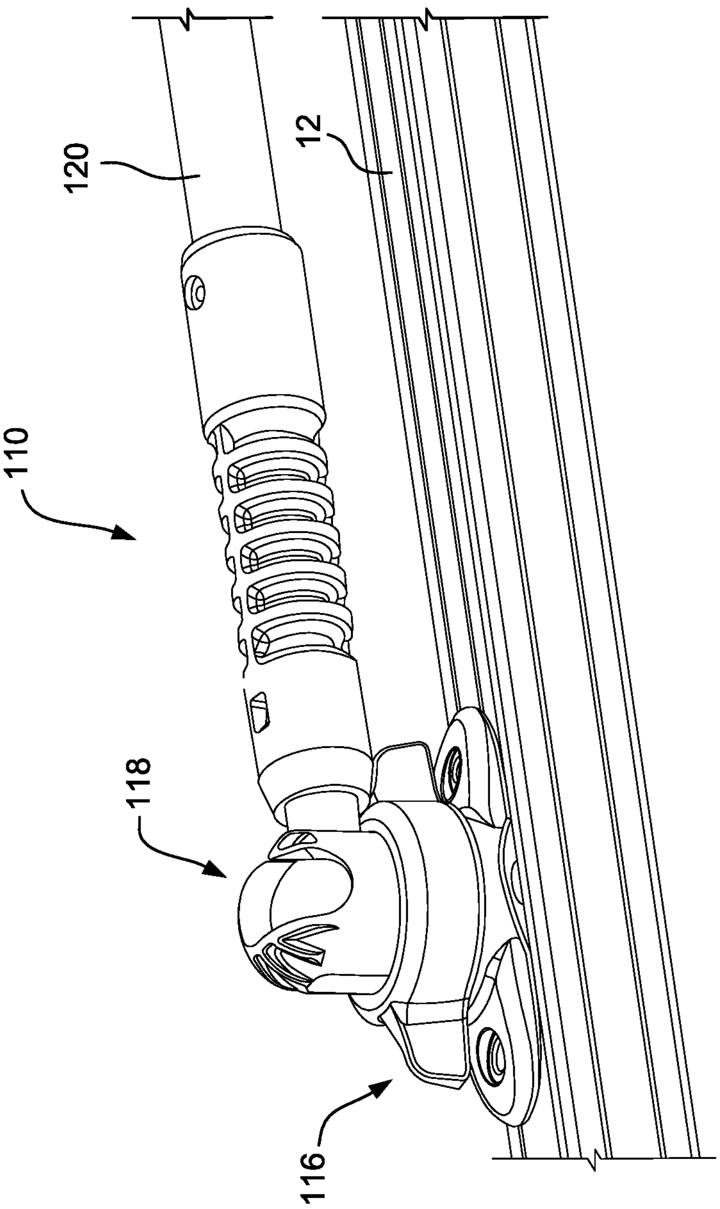
FIGS. 33 and 34 show exemplary wire routing for the assembly.
Figure 34:
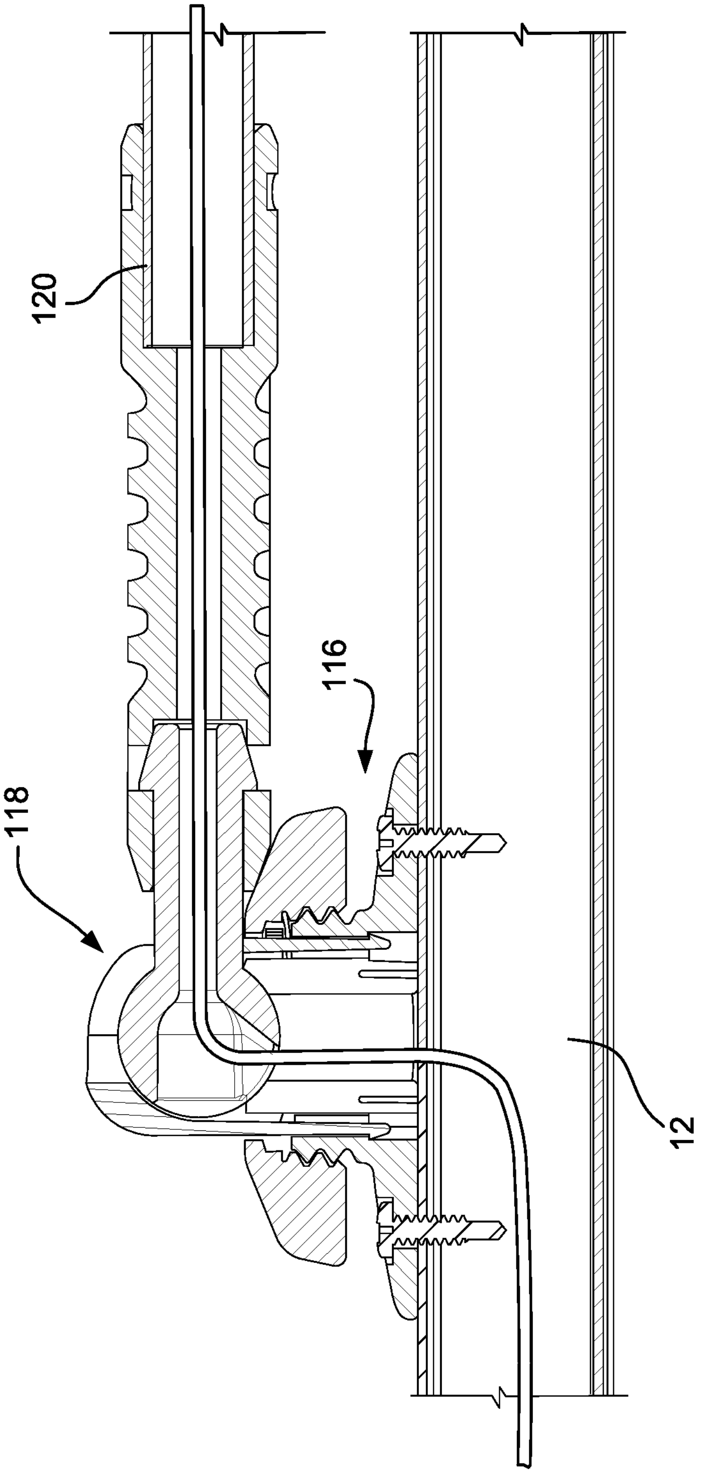

FIGS. 33 and 34 show the mast navigation light 110 in a stowed position, with the mast 120 essentially parallel and in alignment with the frame member of the Bimini top 12. FIG. 33 shows a wire exit slot 116*e* in the base assembly 116. FIG. 34 shows a variation where wires are guided into the frame member of the Bimini top 12.

Figure 35:
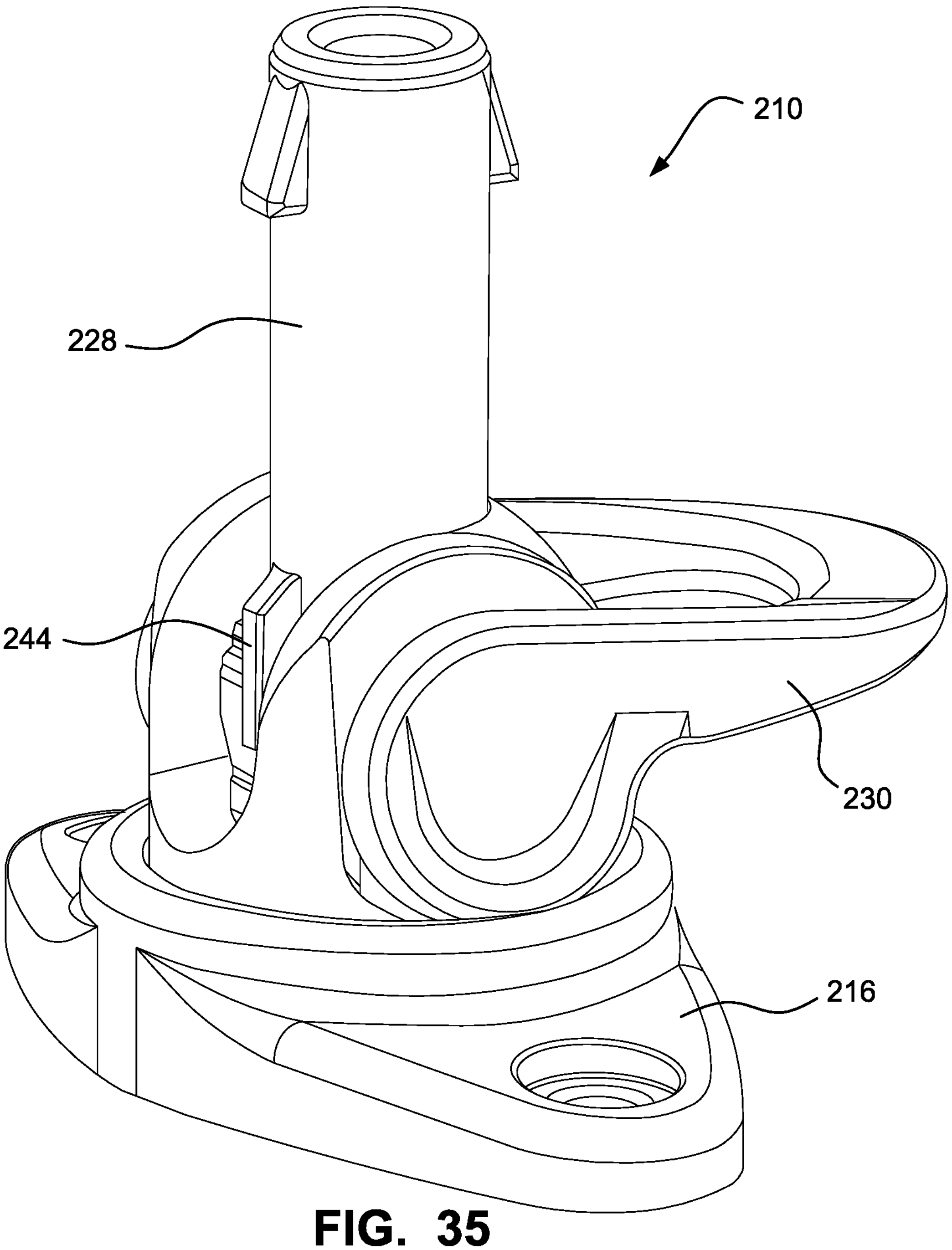
FIGS. 35-37 show another alternative embodiment of the assembly.
Figure 36:
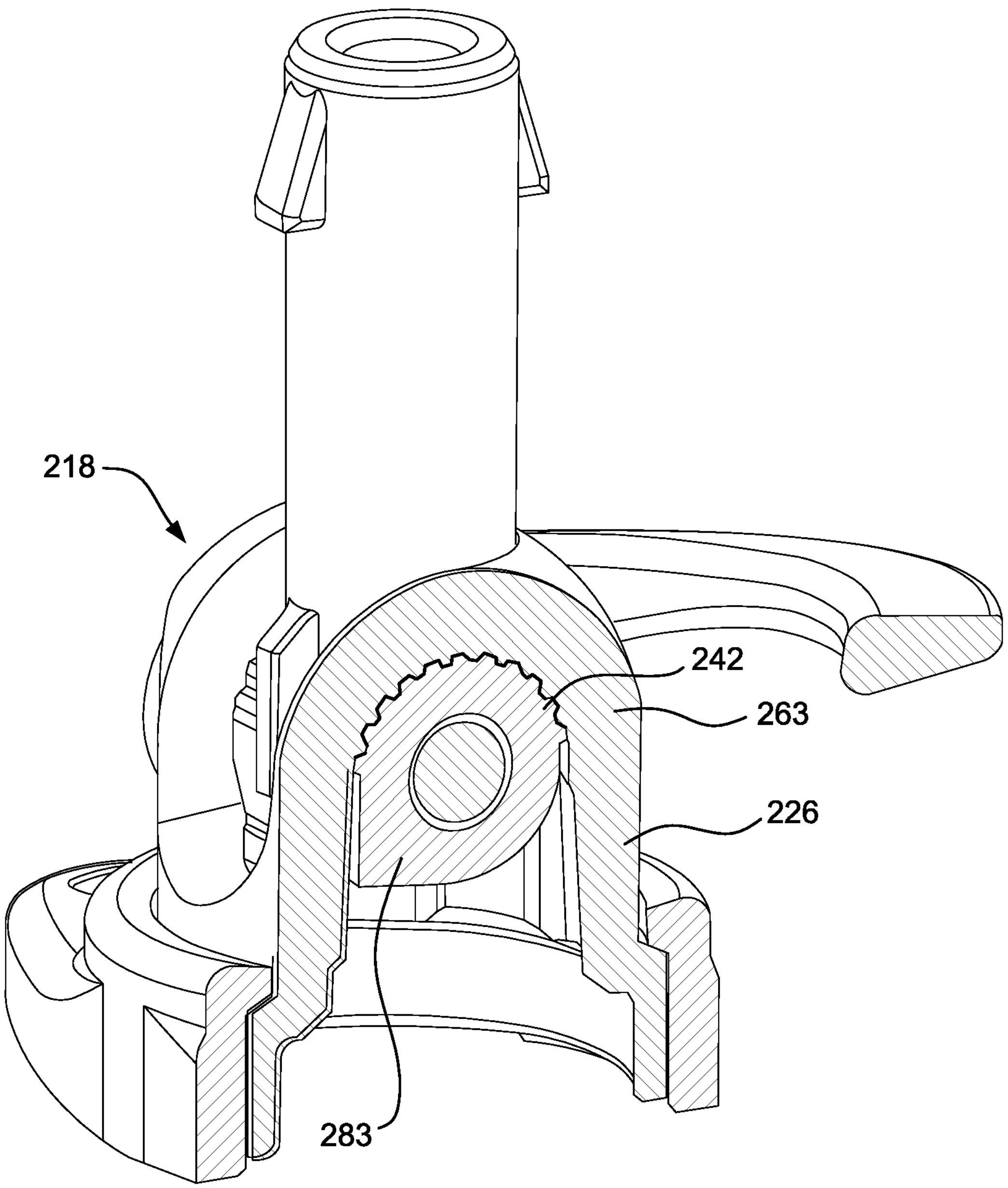
Figure 37:
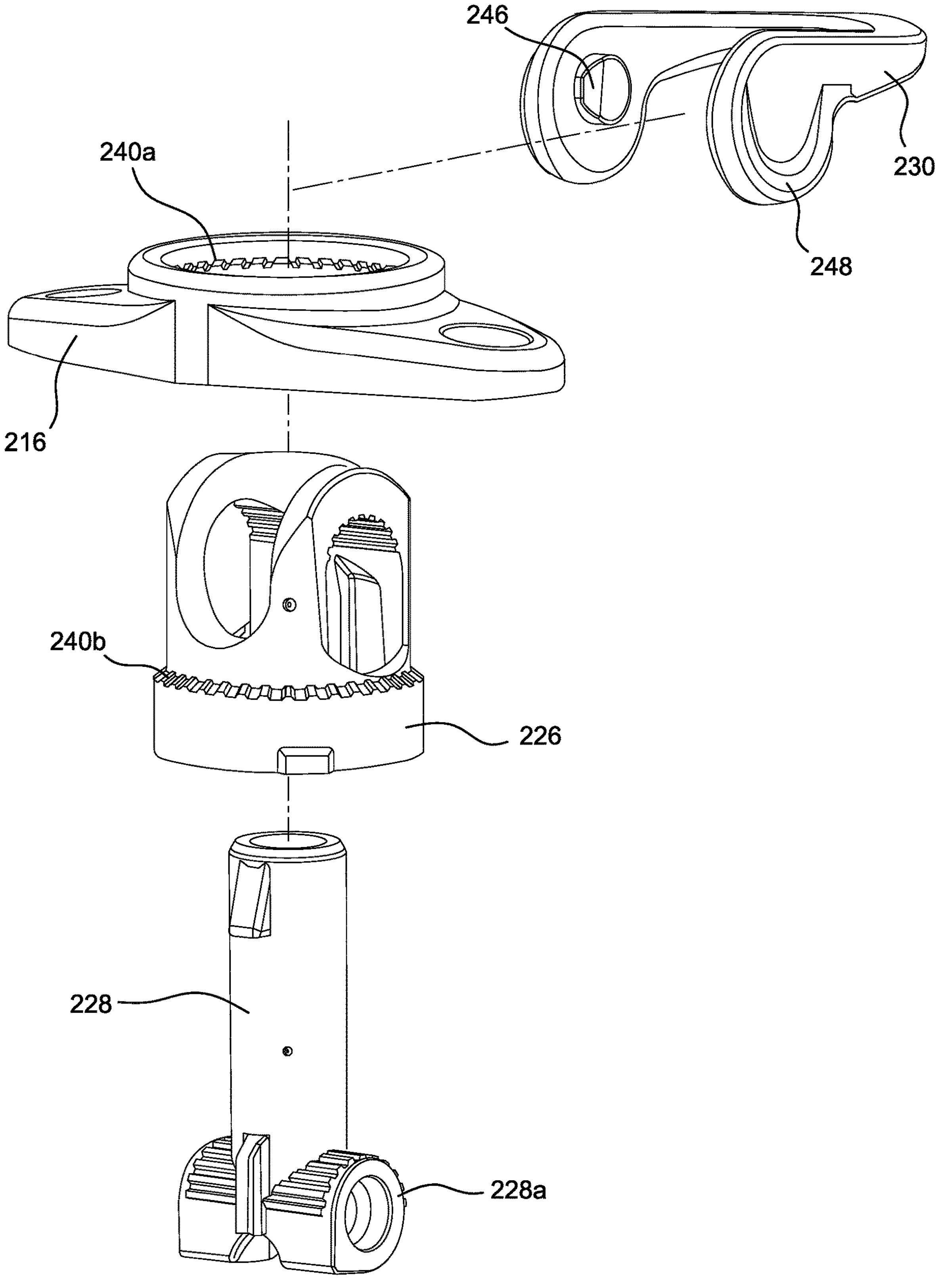

FIGS. 35-37 show an alternative base assembly and pivot mechanism for the mast navigation light 210. The assembly includes the base assembly 216 affixable to a surface and a pivot mechanism 218 secured to the base assembly. The pivot mechanism 218 includes a cap 226 and a T-post 228 similar to previously described embodiments. A cam lock lever 230 is coupled with the T-post 228.

As seen in FIG. 37, the base 216 includes a downwardly facing rim of detents 240*a* that corresponds to and interacts with an upwardly facing rim of detents 240*b* on the cap 226. Detents 240*a*, 240*b* allow for incremental rotational adjustment and locking of the cap 226 relative to the base 216 for user-selected positioning of the mast navigation light.

As seen in FIG. 36, the cross member 228*a* of the T-post 228 includes a plurality of convex protrusions 242 that interact with corresponding concave detents 263 in the cap 226. The protrusions 242 are movable and interlock with the detents 263 to lock the T-post 228 in incrementally angled positions. The rim of detents 240*a*, 240*b* in the base 216 and the cap 226 respectively create up to 90 degrees of positional orientation adjustment of the mast (not shown), and the convex protrusions 242 and concave detents 263 in the T-post 228 and cap 226 respectively provide more precise angular adjustment of the mast.

The T-post 228 may include a rotational stop 283 for secure locking of the mast in the upright position. The T-post 228 may also include a rib 244 to prevent incorrect installation of the T-post with the cap 226. In particular, the T-post is prevented from being installed 180 degrees in the wrong orientation relative to the rest of the assembly. The interior side surfaces of the cam lock lever 230 may include a chamfered tab 246 to help the legs of the lever extend, enter, and lock with the corresponding apertures of the T-post cross member 228*a*. The cam lock lever may also include a thicker ridge or grip 248 along the bottom exterior edge of the two sides of the lever for better grip during installation and in use. As seen in FIG. 35, the ridge 248 may be angled to interface with the conical top surface of the base 216.

The mast navigation light of the described embodiments is configured for pivotable adjustment in at least two axes and provides advantages over existing assemblies. The light may include an elastomeric connector for impact damage prevention as well as a quick lock and release system, anti-rotation features, and a wire routing option. The assembly is selectively positionable for use and can be readily stowed for enclosure within a Bimini top or the like.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A mast navigation light comprising:
- a base assembly affixable to a surface;
- a pivot mechanism secured to the base assembly;
- a mast coupled at a proximal end with the pivot mechanism; and
- a light secured to a distal end of the mast,
- wherein the pivot mechanism comprises:
  - a cap coupled with the base assembly and rotatable relative to the base assembly about a first axis in a circumferential slot of the base assembly, and
  - a T-post coupled with the cap and pivotable relative to the cap about a second axis perpendicular to the first axis,
- wherein the mast is connected to the T-post such that the pivot mechanism is configured to effect pivoting of the mast about at least the first and second axes without detaching the mast or the pivot mechanism from the base assembly.

2. A mast navigation light according to claim 1, wherein the mast comprises a flex section.

3. A mast navigation light according to claim 2, wherein the flex section comprises one of an elastomeric tube or a coil spring.

4. A mast navigation light according to claim 1, wherein the pivot mechanism is configured to effect forward and aft pivoting of the mast and to effect lateral pivoting of the mast.

5. A mast navigation light according to claim 1, wherein the cap comprises a pivot slot in which the T-post is pivotable, the pivot slot defining a pivot range for the T-post.

6. A mast navigation light according to claim 5, further comprising a cam lock lever coupled with the T-post and displaceable between an unlocked position and a locked position, the cam lock lever including at least one cam surface that locks the T-post in place when the cam lock lever is displaced to the locked position.

7. A mast navigation light according to claim 1, wherein the T-post comprises a cross member and a vertical leg defining a T-shape, and wherein the cross member is coupled with the cap.

8. A mast navigation light according to claim 7, wherein a cross-section of the cross member is non-circular.

9. A mast navigation light according to claim 7, wherein the mast is connected to the vertical leg of the T-post.

10. A mast navigation light according to claim 9, wherein the mast comprises a flex section, and wherein the flex section is connected to the vertical leg of the T-post.

11. A mast navigation light according to claim 7, wherein the cross member of the T-post comprises a first convex protrusion, corresponding to a zero degree position, and a second convex protrusion, corresponding to a forty-five degree position, selectively engageable with a concave detent in the cap.

12. A mast navigation light according to claim 7, wherein the cross member of the T-post comprises a plurality of convex protrusions that interact with corresponding concave detents in the cap.

13. A mast navigation light according to claim 1, wherein the cap comprises a stop member disposed in the circumferential slot, and wherein the circumferential slot defines rotational limits for the cap relative to the base assembly.

14. A mast navigation light according to claim 1, wherein the base assembly comprises a wire exit slot.

15. A mast navigation light according to claim 1, wherein the base assembly comprises an adapter plate securable to a frame member and a base plate connected to the adapter plate, and wherein the pivot mechanism is secured to the base plate.

16. A mast navigation light comprising:

a base assembly affixable to a surface;

a pivot mechanism secured to the base assembly;

a mast coupled at a proximal end with the pivot mechanism; and a light secured to a distal end of the mast, wherein the pivot mechanism comprises:

a cap coupled with the base assembly and rotatable relative to the base assembly about a first axis in a circumferential slot of the base assembly, and a T-post coupled with the cap and pivotable relative to the cap about a second axis perpendicular to the first axis, wherein the mast is connected to the T-post such that the pivot mechanism is configured to selectively effect forward and aft pivoting of the mast in use and lateral pivoting of the mast to a stowed position without detaching the mast or the pivot mechanism from the base assembly.

17. A mast navigation light according to claim 16, wherein the cap comprises a pivot slot in which the T-post is pivotable, the pivot slot defining a pivot range for the T-post.

18. A mast navigation light according to claim 17, further comprising a cam lock lever coupled with the T-post and displaceable between an unlocked position and a locked position, the cam lock lever including at least one cam surface that locks the T-post in place when the cam lock lever is displaced to the locked position.

19. A mast navigation light according to claim 16, wherein the T-post comprises a cross member and a vertical leg defining a T-shape, and wherein the cross member is coupled with the cap.

20. A mast navigation light according to claim 16, wherein the cap comprises a stop member disposed in the circumferential slot, and wherein the circumferential slot defines rotational limits for the cap relative to the base assembly.

21. A mast navigation light according to claim 16, wherein the base assembly comprises an adapter plate securable to a frame member and a base plate connected to the adapter plate, and wherein the pivot mechanism is secured to the base plate.

* * * * *